(12) United States Patent
Hyatt et al.

(10) Patent No.: US 6,901,797 B2
(45) Date of Patent: Jun. 7, 2005

(54) METHOD AND INSTRUMENT FOR GAUGING A WORKPIECE

(75) Inventors: Gregory Aaron Hyatt, West Chester, OH (US); David Wayne Bricker, Batavia, OH (US)

(73) Assignee: Makino Inc., Mason, OH (US)

( * ) Notice: Subject to any disclaimer, the term of this patent is extended or adjusted under 35 U.S.C. 154(b) by 140 days.

(21) Appl. No.: 09/948,120

(22) Filed: Sep. 5, 2001

(65) Prior Publication Data

US 2002/0069547 A1 Jun. 13, 2002

Related U.S. Application Data

(60) Provisional application No. 60/230,012, filed on Sep. 5, 2000.

(51) Int. Cl.$^7$ .......................... G01B 13/08; G01B 13/10
(52) U.S. Cl. ........................... 73/375; 73/376; 73/379; 33/543; 33/543.1; 33/544.4; 33/544.5; 33/644
(58) Field of Search .................. 73/37.5, 37.7, 73/37.8, 37.9; 33/543.1, 544.3, 785

(56) References Cited

U.S. PATENT DOCUMENTS

| | | | |
|---|---|---|---|
| 2,572,368 A | | 10/1951 | Minix |
| 2,623,294 A | * | 12/1952 | Fox ........................... 33/543.1 |
| 2,706,339 A | | 4/1955 | Aller |
| 2,777,257 A | | 1/1957 | Johnson |
| 2,795,855 A | | 6/1957 | Worthen |
| 3,028,677 A | | 4/1962 | Schonfield |
| 3,100,349 A | | 8/1963 | Stresau |
| 3,201,974 A | | 8/1965 | Croshier |
| 3,241,356 A | | 3/1966 | Blaiklock |
| 3,254,415 A | | 6/1966 | Eisele |
| 3,287,811 A | | 11/1966 | Hollis |
| 3,494,078 A | * | 2/1970 | Miyamoto ..................... 451/8 |
| 3,543,779 A | * | 12/1970 | Eckerlin et al. ............... 73/700 |
| 3,646,685 A | | 3/1972 | Goodenough |
| 3,682,191 A | * | 8/1972 | Lechner, Jr. ................. 137/804 |
| 3,782,171 A | | 1/1974 | Watt |
| 3,792,605 A | * | 2/1974 | Rabenau ...................... 73/37.9 |
| 3,808,696 A | | 5/1974 | Possati |
| 3,842,658 A | * | 10/1974 | Ellis et al. .................... 73/37.9 |
| 4,016,747 A | | 4/1977 | Radev |
| 4,030,202 A | | 6/1977 | Fadl et al. |
| 4,070,902 A | * | 1/1978 | Knobel ........................ 73/37.5 |
| 4,121,451 A | | 10/1978 | Radev et al. |
| 4,227,310 A | * | 10/1980 | Vanderwal, Jr. .............. 33/542 |
| 4,255,365 A | * | 3/1981 | Heyer ......................... 264/468 |
| 4,477,977 A | | 10/1984 | Lusignea et al. |
| 4,538,449 A | * | 9/1985 | Wegmann et al. ........... 73/37.9 |

(Continued)

FOREIGN PATENT DOCUMENTS

| | | |
|---|---|---|
| DE | 10006777 | 8/2000 |
| GB | 0753781 | 8/1956 |
| GB | 1774870 | 5/1957 |

*Primary Examiner*—Hezron Williams
*Assistant Examiner*—David A. Rogers
(74) *Attorney, Agent, or Firm*—Dinsmore & Shohl LLP

(57) ABSTRACT

An instrument is adapted to be attached to a rotational member of an instrument station for obtaining information about a workpiece. The instrument includes at least one orifice adapted to be placed in selective fluid communication with a source of fluid. An instrument station may also be provided to include an instrument and a rotational member connected to the instrument for rotating the instrument about a rotational axis. The instrument station may also include a source including fluid, wherein the fluid source is in fluid communication with the instrument and a monitoring apparatus. An apparatus may also include an instrument and a source of substantially incompressible fluid wherein the source is in fluid communication with the instrument. Methods of obtaining information about a workpiece and methods for determining the center of a bore are also disclosed.

47 Claims, 15 Drawing Sheets

U.S. PATENT DOCUMENTS

| | | | | |
|---|---|---|---|---|
| 4,852,262 A | * | 8/1989 | Babcock et al. | 33/543.1 |
| 4,872,269 A | * | 10/1989 | Sattmann | 33/552 |
| 4,977,777 A | * | 12/1990 | Bieg | 73/37.5 |
| 5,152,166 A | | 10/1992 | Brock et al. | |
| 5,212,980 A | | 5/1993 | Wegmann | |
| 5,616,853 A | * | 4/1997 | Oshumi | 73/37.5 |
| 5,619,803 A | | 4/1997 | Decool | |
| 5,679,061 A | * | 10/1997 | Thielenhaus | 451/51 |
| 5,789,661 A | * | 8/1998 | Fauque et al. | 73/37.5 |
| 5,800,252 A | | 9/1998 | Hyatt | |
| 6,243,962 B1 | | 6/2001 | Brock | |

* cited by examiner

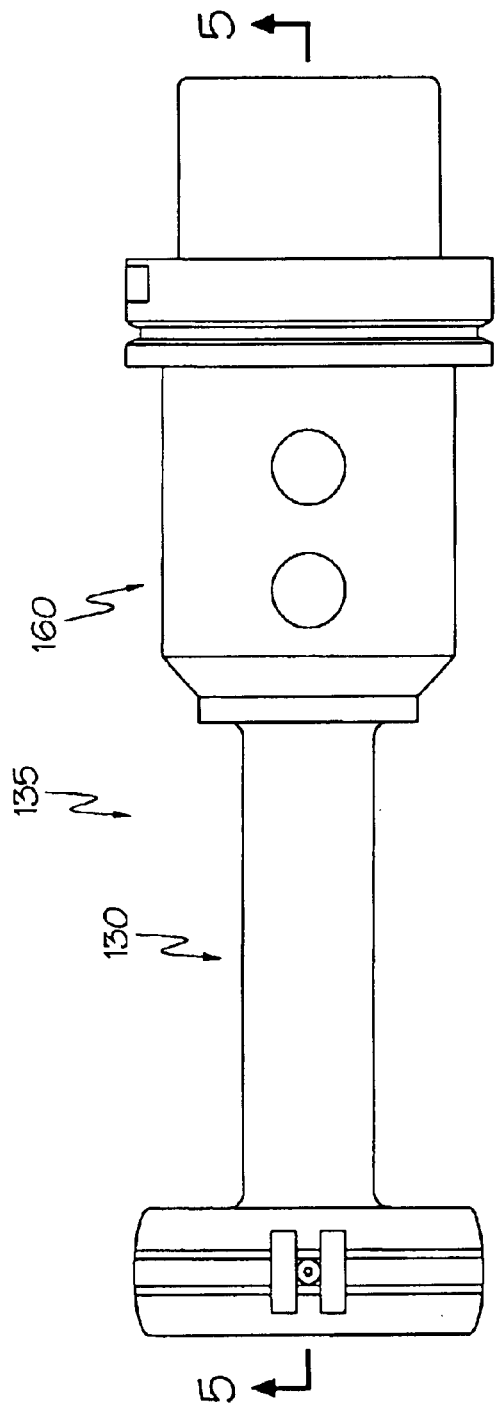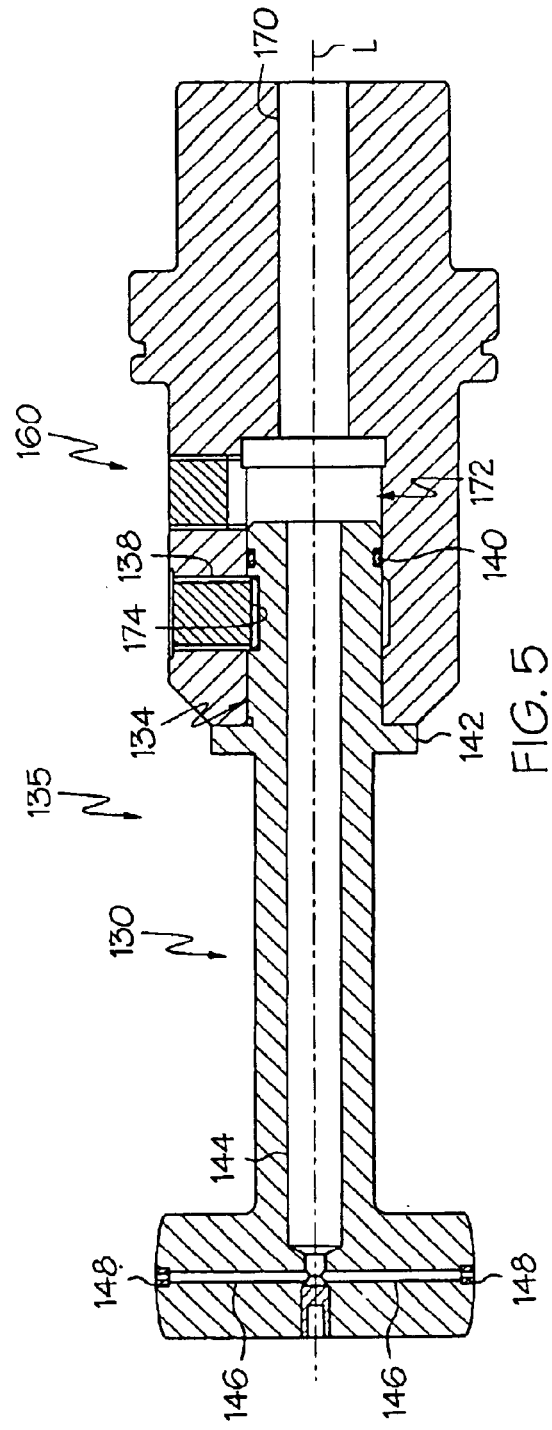

METHOD AND INSTRUMENT FOR GAUGING A WORKPIECE

CROSS-REFERENCES TO RELATED APPLICATIONS

This application claims the benefit of U.S. Provisional Application No. 60/230,012, filed Sep. 5, 2000.

BACKGROUND OF THE INVENTION

It is known to use a pneumatic measuring device to measure the size of a part. For example, a known measurement device has a nozzle and a measurement chamber fed with pressurized gas. A pressure gauge is used to measure the pressure in the chamber to determine the distance between the nozzle and the wall of the part. However, the use of compressed gas may not be desirable in certain applications due to likelihood of compressed gas explosions and the inadequate precision of measurements. In addition, prior art devices require separate measurement and machining devices, thereby often requiring a relatively long change over time to switch between machining and measuring operations.

SUMMARY OF THE INVENTION

Accordingly, it is an object of the present invention to address and obviate problems and shortcomings of conventional instruments and methods.

It is a further object of the present invention to provide an improved performance instrument.

To achieve the foregoing and other objects in accordance with the present invention an instrument station for obtaining information about a workpiece is provided. The instrument station includes an instrument including at least one fluid dispensing orifice, a rotational member connected to the instrument for rotating the instrument about a rotational axis, and a source for providing a fluid capable of being dispersed by the instrument. The fluid source is in fluid communication with the instrument. The instrument station further comprises a monitoring apparatus.

To achieve still further objects and in accordance to the present invention, an apparatus for obtaining information about a workpiece is provided. The apparatus includes an instrument including at least one fluid dispersing orifice adapted to disperse a substantially incompressible fluid and a source for providing a fluid capable of being dispersed by the instrument. The source is in fluid communication with the instrument. The apparatus may further comprise a monitoring apparatus.

To achieve additional objects and in accordance with the present invention, an instrument is provided. The instrument is adapted to be attached to a rotational member of an instrument station for obtaining information about a workpiece. The instrument includes at least one orifice adapted to be placed in selective fluid communication with a source of fluid and a body including a first end and a second end. The first end is adapted for removable connection to a rotational member of an instrument station.

To achieve still further objects and in accordance with the present invention, a method of obtaining information about a workpiece is provided. The method includes the steps of providing a workpiece including at least one surface and providing an instrument station. The instrument station includes an rotational member with a rotational axis and an instrument including a first end and a second end. The instrument is adapted for attachment adjacent the first end to the rotational member. The instrument station further includes a source for providing a fluid, and a monitoring apparatus. The method further includes the step of providing the instrument with fluid from the fluid source such that fluid is dispersed in an outward direction from the instrument. The method still further comprises the steps of orienting the second end of the instrument adjacent the surface such that fluid dispersed from the instrument contacts the surface of the workpiece and monitoring the fluid with the monitoring apparatus to obtain information about the workpiece.

To achieve further objects and in accordance with the present invention, a method of obtaining information about a workpiece is provided. The method includes the steps of providing a workpiece including at least one surface and providing an apparatus with an instrument, a source for providing substantially incompressible fluid and a fluid monitoring apparatus. The method further comprises the steps of supplying substantially incompressible fluid to the instrument such that fluid is dispersed from the instrument and contacts the surface of the workpiece and monitoring the fluid with the fluid monitoring apparatus.

To achieve still further objects and in accordance with the present invention, a method of determining the center of a bore defined in a workpiece is provided. The method comprises the steps of providing a workpiece including at least one surface defining a bore and providing an instrument station including a rotational member and an instrument including a first end and a second end. The instrument is adapted for attachment adjacent the first end to the rotational member. The instrument station further comprises a source for providing a fluid, and a fluid monitoring apparatus. The method further comprises the steps of providing the instrument with fluid from the source such that fluid is dispersed in an outward direction from the instrument, rotating the instrument, and inserting the second end of the instrument at least partially into the bore at a predetermined position such that fluid emitted from the instrument contacts the surface defining the bore. The method also includes the additional steps of monitoring the fluid with the fluid monitoring apparatus as the instrument rotates and disperses fluid and determining the center position of the bore relative to the predetermined position based on the information obtained from the fluid monitoring apparatus.

Still other advantages of the present invention will become apparent to those skilled in the art from the following description wherein there are shown and described alternative exemplary embodiments of this invention. As will be realized, the invention is capable of other different, obvious aspects and embodiments, all without departing from the invention. Accordingly, the drawings and descriptions should be regarded as illustrative in nature and not as restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 4 is a side elevational view of an exemplary instrument made in accordance with the present invention;

FIG. 5 is a vertical sectional view along line 5—5 of FIG. 4 illustrating details of the instrument;

DETAILED DESCRIPTION OF EXEMPLARY EMBODIMENTS

Figure 1:
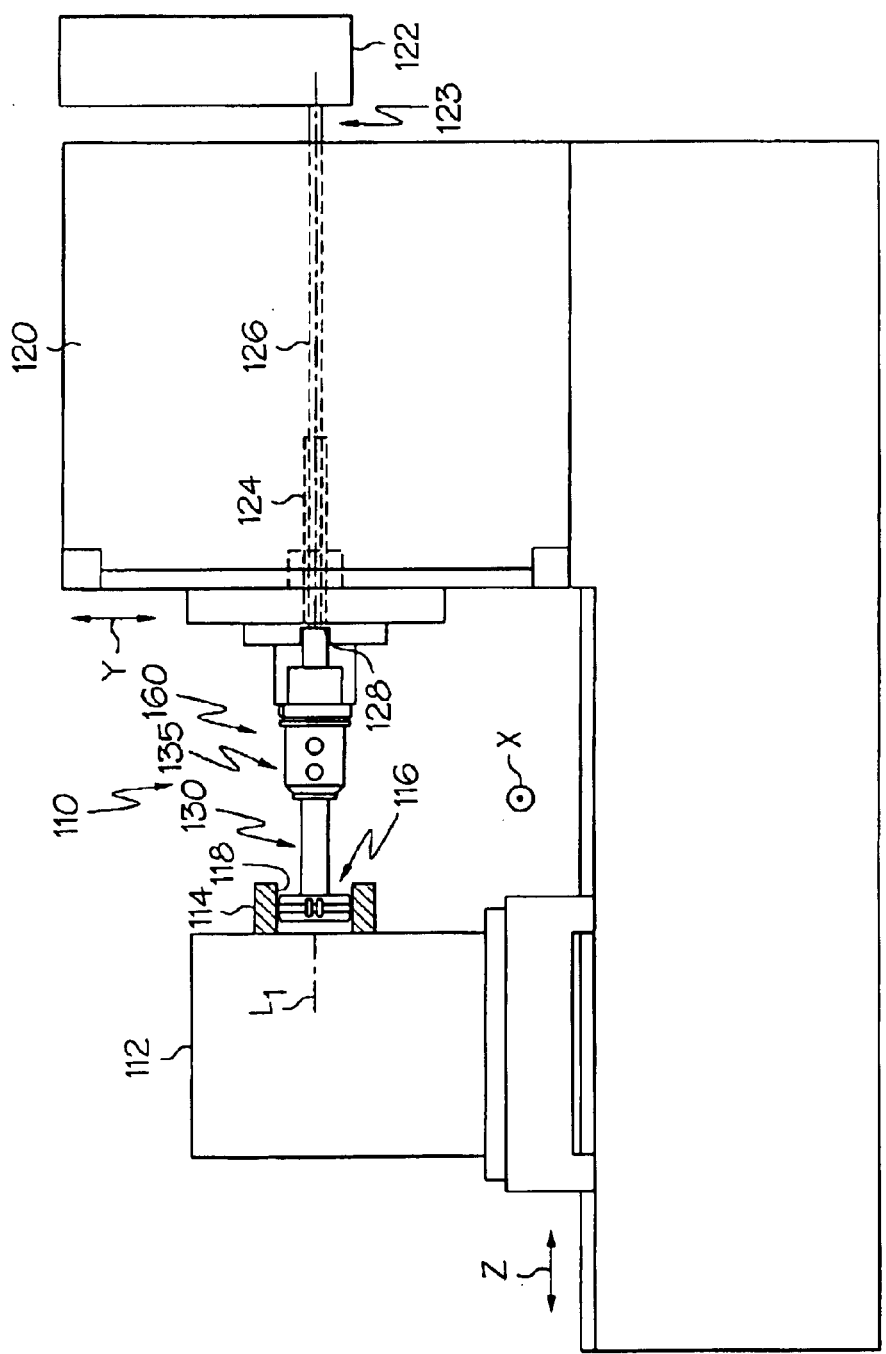
FIG. 1 is a schematic elevational view of an instrument station showing fluid communication between an exemplary instrument and a source of pressurized fluid in accordance with the present invention arranged for quick change use in an instrument station environment.

Referring now to the drawing figures in detail, where like numerals indicate the same elements throughout the views, FIG. 1 illustrates a working area 110 similar to the working area described in U.S. Pat. No. 5,800,252 to Hyatt issued on Sep. 1, 1998, the entire disclosure incorporated herein by reference.

The working area 110 in accordance to the present invention typically comprises an instrument station 120, such as a machining station, and a work head 112 having a workpiece 114 attached thereto using fixtures and techniques known in the industry. Workpiece 114 is illustrated as a single exemplary structure having a bore hole 116 with an interior surface 118. The working area 110 is typically used to hone and/or grind a bore. However, as an alternative to machining the workpiece, one object of the present invention is to use the instrument station 120 to analyze a workpiece. For instance, the machining device (e.g., grinding and/or honing device) may be removed and replaced with an instrument 135 in order to measure the surface characteristics of the workpiece (e.g., flat surfaces, rounded surfaces, bores, cavities, interior surfaces, exterior surfaces, or other surfaces of the workpiece). As shown in FIG. 1, for example, the working area 110 may be provided with a workpiece having a bore hole 116 with an interior surface 118 that requires measurement.

As an exemplary embodiment of the present invention, FIG. 1 depicts the working area 110 being provided with an instrument 135 for analyzing the bore hole 116 of the workpiece 114. The instrument 135 may comprise an instrument element 130 and a holding element 160 to attach the instrument element 130 at an interface to a rotational member. In one exemplary embodiment, the interface comprises a spindle/instrument interface 128 while the rotational member may comprise an instrument spindle 124 of an instrument station 120. In one particular embodiment, the instrument 135 is attached at a spindle interface 128 of a machine spindle of a machining station. The working area 110 also includes a fluid supply system 123 that generally provides fluid from a source of pressurized fluid 122 to be routed through the rotational member, such as the instrument spindle 124 (via spindle passageway 126), and to the instrument 135.

In one exemplary mode of operation, the instrument 135 is brought adjacent a workpiece 114 prior to measurement. The measurement may take place with general rotation between the instrument and the workpiece about rotational axis ($L_1$) and may be moved relative to each other along a horizontal axis (X), a vertical axis (Y), and/or a horizontal axis (Z) as the instrument 135 analyzes the interior surface 118 the bore hole 116 or other surface of the workpiece 114. Alternatively, the instrument is not rotated but generally brought adjacent the work surface for measurement.

The present invention may be adapted for use with an instrument station 120 having an instrument spindle 124 which can be rotated at varying speeds about rotational axis ($L_1$) by a power source (not shown), and which can quickly and easily receive and secure one of a plurality of instruments, such as machining instruments, analyzing instruments, combinations of machining instruments and analyzing instruments and/or other device(s) for various operations (e.g., analyzing and/or machining at a stationary position and/or during rotation, vibration, or oscillation).

An instrument station 120 typically has a synchronized system, such as an automatic device changer (not shown), for quickly and easily interchanging and utilizing multiple matching instruments at one instrument station 120, thereby allowing the instrument station 120 to provide greater utility or range of operations (i.e., they are not dedicated to a single mode of operation or use with a single type of device).

The instrument 135 may include an instrument element 130 and a holding device. The holding device could comprise a holding element 160, an adapter 180, and/or other assembly for engaging (i.e., clamping or otherwise securing) a proximal end 134 of the instrument element 130 in a generally cantilevered fashion with a rotational member such as an instrument spindle 124. For example, the rotational member could comprise a drawbar, a collet, a mandrel device, or other rotational member known in the industry that can provide fluid to the instrument 135 adjacent to the spindle/instrument interface 128 while the instrument 135 is in use.

U.S. Pat. No. 5,800,252 to Hyatt, the entire disclosure herein incorporated by reference, discloses one engaging assembly that may be used with the present invention that allows for quick interchange of instrument elements such as honing and/or other devices to permit fluid communication between the spindle passageway 126 and the passage 170 of a holding element 160 without the need for separately hooking up hydraulic lines or other fluid connections. As will be understood, the instrument elements described herein could also be attached to a rotational member, such as the spindle 124, with other holding devices and that the instrument elements may be designed for attachment with a specific holding element accordingly. It will also be appreciated that the holding device described herein could also be designed or selected to cooperate with the particular type of instrument element. Moreover, while the instrument element 130 is depicted as being used with an instrument station 120, it is understood that the instrument element 130 may be utilized in other conventional applications and operations.

Figure 2:
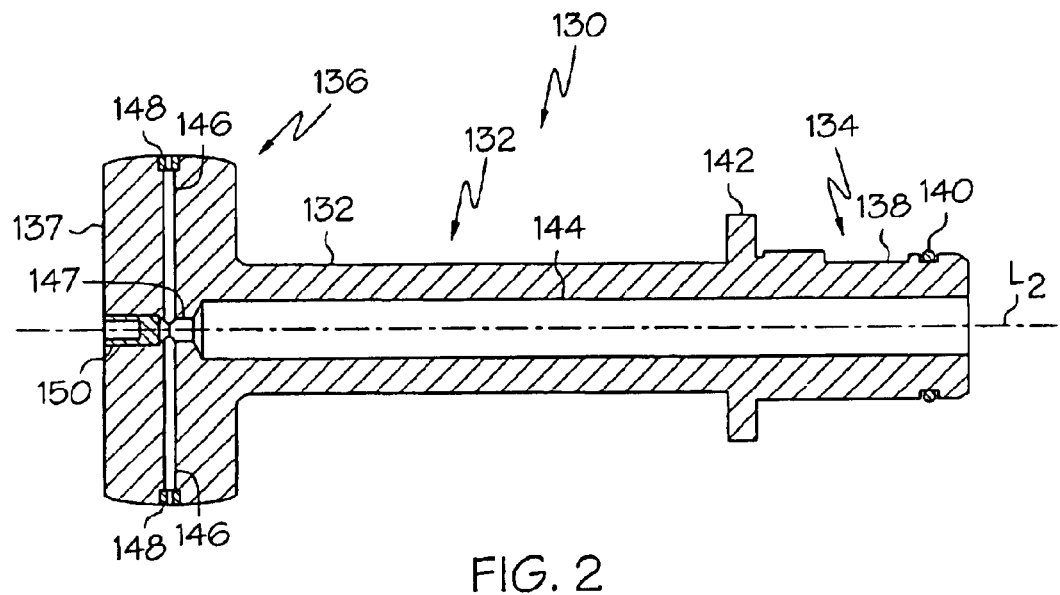
FIG. 2 is sectional view of an instrument element in accordance with the present invention.

Many different instruments may be incorporated with the instrument station without departing from the concept and scope of the present invention. For instance, one exemplary instrument element 130, as best seen in FIG. 2, comprises a body 132 extending at least partially along a longitudinal axis ($L_2$) and having a proximal end 134 and a distal end 136. As illustrated in FIG. 2, for example, the distal end 136 may comprise an enlarged portion. Alternatively, as described below, it is understood that the distal end may be designed without an enlarged portion and may even comprise a reduced portion. Accordingly, it is understood that each of the instrument elements discussed throughout this application could have a various distal end portions with at least one of an enlarged or reduced portion, without an enlarged or reduced portion, or otherwise.

As further illustrated in FIG. 2, the proximal end 134 is adapted to be received and secured by a holding device that will be described more fully below. In one exemplary embodiment, the proximal end 134 may include a seal 140, such as an O-ring, to provide a fluid tight connection between the instrument element 130 and the holding device. The instrument element 130 may also include a stop member, such as a flange 142, to abut a portion of the holding device, thereby controlling the relative position between the instrument element 130 and the holding device. In addition, the proximal end 134 may be provided with a keyed recess 138 to receive a key from a holding device (e.g., key 174 from holding element 160) in order removably connect the instrument element 130 to the holding device. The keyed recess 138 also functions to limit or prevent relative movement (e.g., translational or rotational) of the instrument element 130 relative to the holding device once they are connected together. As discussed above, it will be appreciated that the proximal end 134 may be designed for cooperation with the particular type of holding device used to attach the instrument element 130 to the spindle 124 of the instrument station 120.

The instrument element 130 includes an interior passage 144 adapted to provide a fluid passageway from adjacent the proximal end 134 to adjacent the distal end 136 of the instrument element 130. In one embodiment, as shown in FIG. 2, one passageway 144 may be provided that extends along a longitudinal axis ($L_2$) of the instrument element 130. For example, as illustrated in FIG. 2, the longitudinal axis ($L_2$) may be at least substantially located along a symmetrical axis of the instrument element 130 such that the center of gravity of the instrument element 130 substantially lies along the longitudinal axis ($L_2$), thereby assisting in balancing the instrument 135 when rotating. Alternatively, a plurality of passageways may be symmetrically arranged about the longitudinal axis ($L_2$) in order to assist in balancing the instrument 135. It is also contemplated that the instrument element 130 may include non-symmetrical passageways or structures in rotational and/or non-rotational applications. For example, it is contemplated that the passageway 144 and/or longitudinal axis ($L_2$) could be disposed such that they do not substantially extend along the symmetrical axis of the instrument and may not present a balancing concern, particularly during applications where the instrument is stationary in use or while the instrument is rotating at lower angular velocities in use.

The distal end 136 of the instrument element 130 may further include one or more passages 146, that permit the fluid to travel laterally away from the longitudinal axis ($L_2$) of the instrument 130. The instrument element 130 may further comprise one or more orifices oriented to disperse fluid in an outward direction from the instrument body 132.

Throughout this application, one or more orifices may be provided by nozzles. For example, one or more nozzles may be located adjacent the instrument body of the instrument element to provide one or more orifices. The orifice(s) may also be adapted to be located adjacent the distal end of the instrument body. In one particular example, for instance, the orifice could be located adjacent to the enlarged portion without necessarily being incorporated as part of the enlarged portion of the distal end. In another example, orifices may be provided by nozzle(s) that are inserted, attached or integrally formed in the distal end in order to provide the orifice(s) and therefore might control the amount, direction, orifice size and stream characteristics of the fluid as it is dispersed from the instrument to contact a surface of the workpiece. It is also understood that structures other than nozzles could provide the one or more orifices. For instance, the end portions of the passage(s) (e.g. 146) may be structured to provide the orifices in the form of an outlet that function to disperse fluid from the instrument. Accordingly, throughout the application, the orifice could comprise an opening, outlet, passage, or other fluid exit arrangement to assist in dispersing fluid from the instrument.

Various nozzles could be optionally used to define an orifice to disperse fluid, such as compressible or incompressible fluid. Nozzles for dispersing incompressible fluid are generally less complex than nozzles for dispersing compressible fluid, since incompressible nozzles do not require structures otherwise needed to disperse a compressible fluid. Nozzles for incompressible fluid may simply include an opening defining the orifice while nozzles for compressible fluids might require additional structure to direct compressible fluid through the orifice defined by the nozzle.

The instrument element 130 as well as other parts of the instrument 135 may be formed from plastics, metals, composites or other suitable materials by injection molding or machining for example. The passageway 144 may be formed by boring from the proximal end 134 towards the distal end 136, without passing through the outer surface 137 of the distal end 136 such that the bore is formed with a first diameter. A passage 146 may also be bored with a diameter that is smaller than the first diameter, from a bottom portion of the distal end 136 (i.e., as shown in FIG. 2) to the upper end of the distal end 136. A connecting passage 147 can also be bored from the outer surface 137 of the distal end 136, through the passage(s) 146 and into the passage 144 to provide fluid communication between the passage(s) 146 and passage 144. A plug 150 may then be inserted to prevent discharge of fluid through the outer surface 137 of the distal end 136, thereby forcing all of the fluid to be discharged through the one or more orifices.

Figure 3:
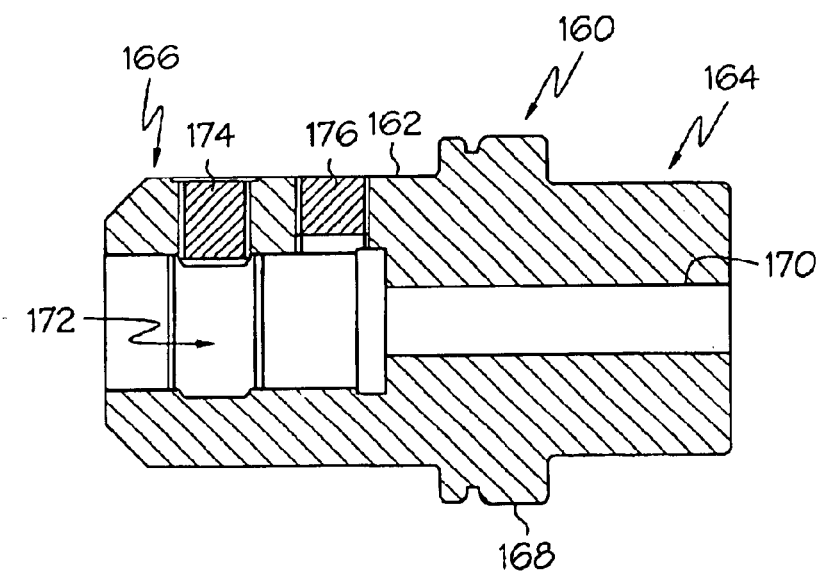
FIG. 3 is a sectional view of a conventional holding element.

FIG. 3 illustrates one exemplary holding device that may comprise a conventional holding element 160 that may be used to attach the instrument element 130 to the spindle 124 of the instrument station 120. Many alternative conventional holding elements and/or other arrangements may be used to facilitate removable attachment of the exemplary instrument 135 to the spindle 124 of the instrument station 120.

In one embodiment, as shown in FIG. 3, the conventional holding element 160 may comprise a base 162 including a first end 164 adapted to be secured by the spindle 124 of the instrument station 120. For instance, the first end 164 may be provided with a flange 168 adapted to abut a portion of the spindle 124 and/or the instrument station 120 to act as a stop to properly locate the instrument 135 relative to the instrument station 120. The holding element 160 may further comprise a second end 166 adapted to secure the instrument element 130 to the holding element 160. As shown in FIG. 3, for instance, the second end 166 may be provided with a socket 172 or other passage, that may receive at least a portion of the proximal end 134 of the instrument element 130. In addition, the holding element may include a key 174 for interlocking with a corresponding keyed recess 138 in the instrument element 130. The holding element 160 may also include a passage 170 adapted to provide fluid communication between the spindle 124 and the instrument element 130 and a plug 176 may be provided to prevent leakage of fluid in use.

The exemplary instrument element 130 and the holding element 160 may be attached together to form the exemplary instrument 135 as illustrated in FIGS. 4 and 5. As illustrated in FIG. 5, the proximal end 134 of the instrument element 130 may be inserted into the socket 172 of the holding element 160 until the flange 142 abuts an end surface of the holding element 160. The key 174, such as a set screw, may then be located and/or tightened such that it enters the keyed recess 138 in the instrument element 130, thereby limiting or preventing relative movement (e.g., translational, or rotational) between the instrument element 130 and the holding element 160. Once attached together, the seal 140 of the instrument element 130 engages the interior wall of the socket 172, thereby providing a fluid-tight seal between the instrument element 130 and the holding element 160. After assembly, the passage 144 of the instrument element is in fluid communication with the passage 170 of the holding element 160 such that the passage(s) 146 may receive pressurized fluid from the spindle 124 of the instrument station 120.

Figure 6:
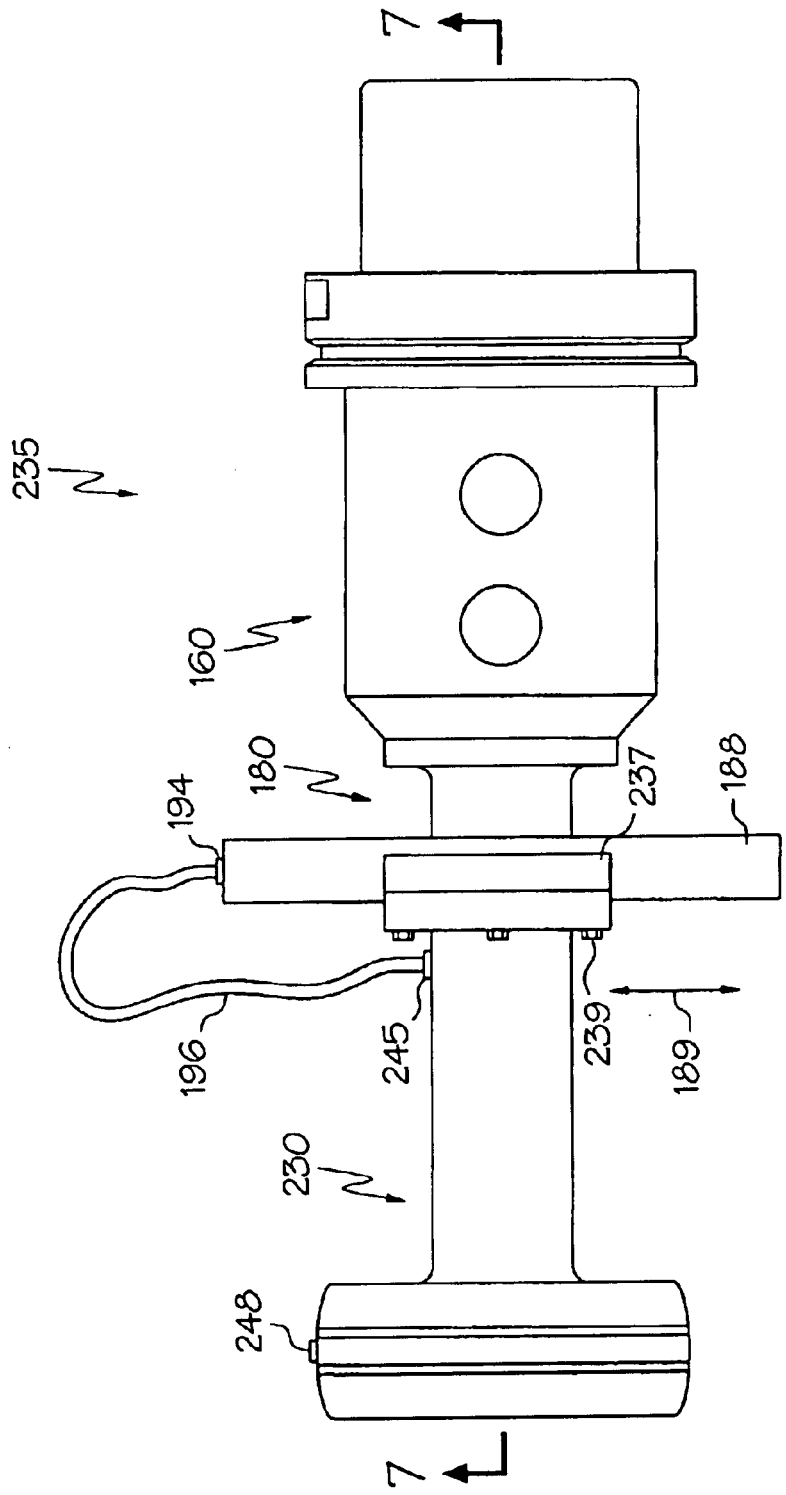
FIG. 6 is a side elevational view of an instrument made in accordance with the present invention.
Figure 7:
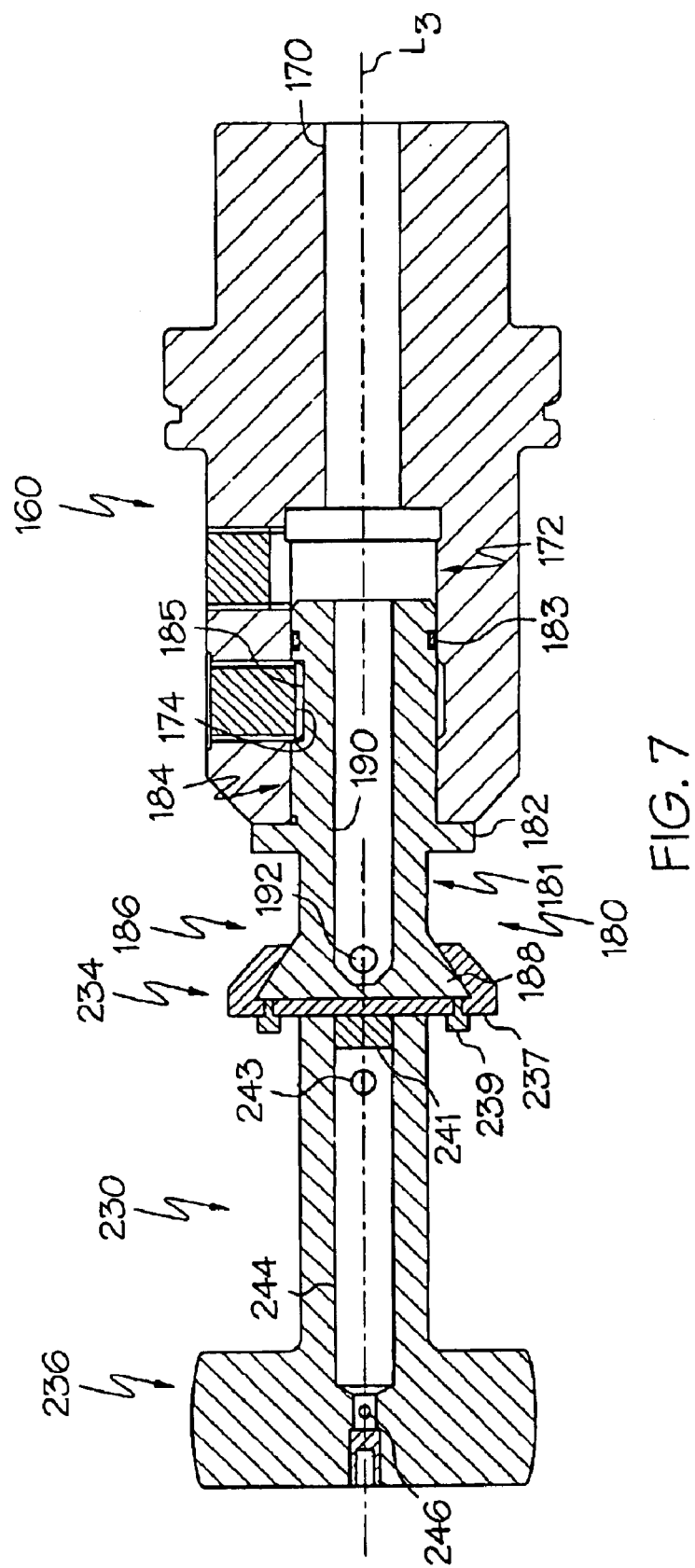
FIG. 7 is a vertical sectional view along line 7—7 of FIG. 6.

FIGS. 6 and 7 illustrate an exemplary instrument 235 with an alternative holding device that may be used to attach the various instrument elements, defined throughout the application, to the spindle 124 of the instrument station 120. The exemplary holding device illustrated in FIGS. 6 and 7 includes a holding element 160 in combination with an adapter 180. The adapter 180 permits the instrument element to be radially adjusted relative to the rotational axis ($L_1$) of the instrument station 120. A holding device with an adapter may be used with various instrument elements described throughout this application. For example, holding devices may comprise an adapter to permit radial adjustment of any instrument element comprising a single orifice defined throughout this application.

In one exemplary embodiment, the adapter 180 may comprise a body portion 181 with a proximal end 184 and a distal end 186. The proximal end 184 is adapted for insertion into the socket 172 of the holding element 160 to provide fluid communication between a longitudinal passage 190 of the adapter 180 and a passage 170 of the holding element 160. A seal 183, such as an O-ring, may be provided on the proximal end 184 to maintain a fluid tight connection between passages 170 and 190. The proximal end 184 of the adapter 180 may also be provided with a keyed recess 185 adapted to receive the key 174 from the holding element 160 to provide a removable connection between the adapter 180 and the holding element 160. The key 174 also assists in limiting or preventing substantial movement between the holding element 160 and the adapter 180. The body portion 181 may also comprise a stop member, such as a flange 182, to properly locate the adapter 180 relative to the holding element 160.

The adapter 180 may also be provided with a guide element 188, adjacent the distal end 186 of the body 181, to facilitate radial adjustment of the instrument element relative to the holding device. For example, the guide element 188 may comprise an elongated rail or other member for providing an adjustment path for the instrument element to travel relative to the holding device. In one particular embodiment, the guide element 188 provides an adjustment path along a direction 189 that is substantially perpendicular to the rotational axis ($L_1$) of the instrument station 120. It is understood, however, that the guide element 188 could be modified to provide an adjustment path at another angle relative to the rotational axis ($L_1$). For example, in still further embodiments, the guide element 188 could be attached for selective angular adjustment relative to the body 181 to allow selective angular orientation of the adjustment direction 189 relative to the rotational axis ($L_1$) to lock the guide element at the desired angle depending on the particular application.

The guide element 186 can also be adapted to facilitate attachment of the instrument element to the holding device. As illustrated in FIGS. 6 and 7 for example, the guide element 186 could comprise a dove-tail element to interlock with a corresponding guide element of the instrument element. For example, an instrument element 230 may include a proximal end 234 with a guide element 237 in the form of a dove-tail element for adjustably interlocking with the dove-tail element of the adapter 180. A locking device 239, such as one or more set screws, may also be used to lock the instrument element 230 relative to the holding device.

As further illustrated in FIGS. 6 and 7, the adapter 180 may include a lateral passage 192 extending through portions of the guide element 188 to facilitate fluid communication between the longitudinal passage 190 of the adapter 180 and a longitudinal passage 244 of the instrument element 230. A flexible conduit 196 may be attached at one end to a coupling 194 attached to the adapter 180 and at the other end to a coupling 245 attached to the instrument element 230. The lateral passage 192 of the adapter 180 provides fluid communication between the coupling 194 and the longitudinal passage 190. Another passage 243 provides fluid communication between the coupling 245 and the longitudinal passage 244.

An optional plug 241 may be inserted adjacent the proximal end 234 of the instrument element 230 to assist in preventing fluid leakage through the end of the longitudinal passage 244. However, it is understood that the instrument element 230 could be designed for a fluid tight seal between the instrument body 232 and the guide element 237 without the use of a plug 241. For example, the guide element 237 could be welded or integrally formed with the instrument element 230 to provide a fluid-tight seal.

As illustrated in FIGS. 6 and 7, the exemplary instrument element 230 could be provided with a single orifice adjacent a distal end 236 of the instrument body 232. The orifice, for example, might be defined by a nozzle 248. A passage 246 may also be defined in the instrument element 230 to provide fluid communication between the orifice and the longitudinal passage 244 of the instrument element 230. Accordingly, it will be appreciated that the instrument 235 may be removably attached with the holding element 160 to the spindle 124 of the instrument station 120. With the locking devices 239 loosened, the instrument element 230 could then be radially adjusted relative to the rotational axis ($L_3$) of the holding element 160 by shifting the instrument element 230 along the adjustment direction 189 until the nozzle 248 is disposed adjacent the interior surface 118 of a workpiece 114, for example.

The locking devices 239 can then be activated, for example by tightening the set screws 239, to assist in locking the instrument element 230 in position after locating it in position relative to the holding element 160. The fluid supply system 123 could then provide pressurized fluid through the spindle passageway 126 to enter the passage 170 of the holding element 160. The fluid then passes through passages 190 and 192 of the adapter 180 to enter the conduit 196. Fluid then travels through the passages 243, 244, and 246 of the instrument element 230 to be dispersed through the orifice that can be defined by a nozzle 248. Information about the workpiece 114 may then be obtained with the use of the instrument 235 while the instrument is stationary or rotating about the rotational axis ($L_1$).

As further illustrated in FIGS. 6 and 7, the longitudinal axis ($L_3$) of the holding element 160 may extend along the rotational axis ($L_1$) of the instrument station 120. In other alternative embodiments, it will be understood that the longitudinal axis ($L_3$) could be offset relative to the rotational axis ($L_1$). In either case, the orifice will be designed to disperse liquid in a direction at an angle, such as a perpendicular angle, relative to the surface of the workpiece.

Figure 8:
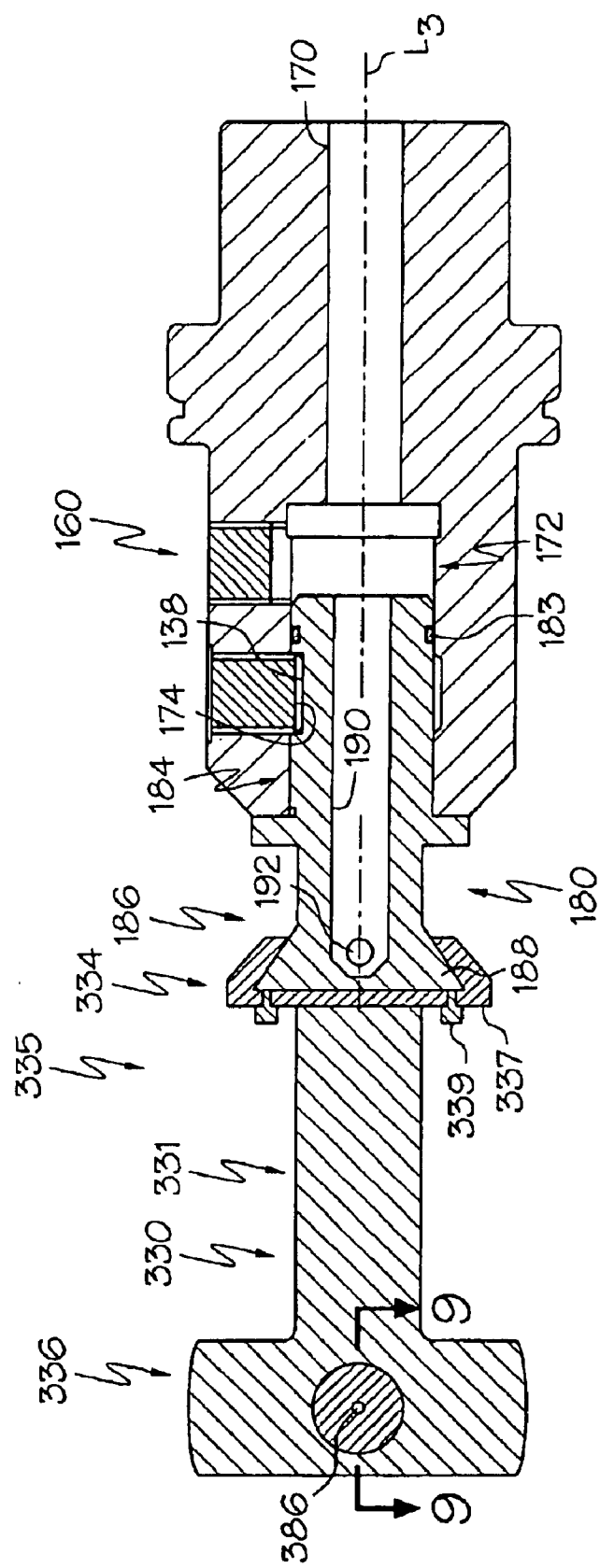
FIG. 8 is a vertical sectional view of another embodiment of the present invention, similar to the embodiment of FIGS. 6 and 7, except having an alternative exemplary instrument element.
Figure 9:
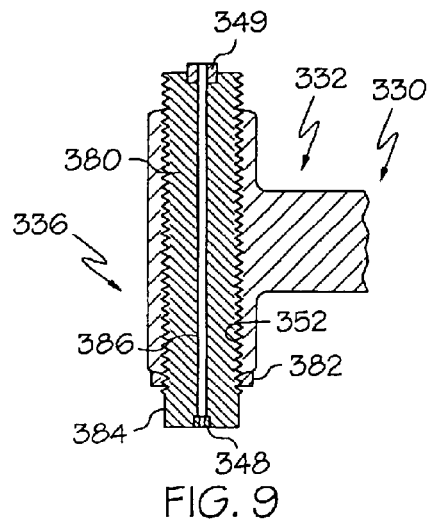
FIG. 9 is a partial sectional view along line 9—9 of FIG. 8.

FIGS. 8 and 9 illustrate an alternative embodiment of an instrument 335 in accordance with another embodiment of the present invention wherein the holding device includes a holding element 160 and an adapter 180 in combination. The holding device, for example, could be designed in a manner similar or identical to the holding device previously described in the exemplary embodiment illustrated in FIGS. 6 and 7. In addition, the exemplary embodiment of FIGS. 8 and 9 permit an adjustment in addition to the adjustment using the adapter 180. For example, a micro adjustment may be provided in addition to a macro adjustment. While it is understood that the instruments of the present invention could be designed with either a macro or a micro adjustment, it is understood that the instrument could be provided with or one or more macro adjustments and/or one or more micro adjustments. For example, FIGS. 8 and 9 illustrate an instrument 335 wherein a macro and micro adjustment may be provided.

FIGS. 8 and 9 depict a guide element 337 of the instrument element 330 adapted to provide a macro adjustment of the orifice relative to the holding device 160, while an extension member 380 may provide the micro adjustment of the orifice relative to the holding element 160. In one exemplary embodiment, the instrument element 330 includes a proximal end 334 including the guide element 337, for instance a dove-tail element, designed to cooperate with the guide element 188 of the adapter 180. A locking device 339, such as one or more set screws, may also be used to lock the instrument element 330 relative to the holding device.

The distal end 336 of the instrument body 332 could be designed with an enlarged portion including a threaded bore 352 for threadably receiving a threaded extension member 380. The extension member 380 could include a passage 386 for providing fluid communication between a coupling 349 and an orifice. In one example, the orifice could be defined by a nozzle 348 adjacent the distal end 336. The coupling 349 is also adapted to be coupled with an end of the conduit 196.

Accordingly, the embodiment illustrated in FIGS. 8 and 9 provides fluid communication between the adapter 180 and the extension member 380 without the need for providing fluid communication with the instrument body 332.

A locking element, such as a jam nut 382, can also be provided to assist in locking the extension member 380 relative to the instrument body 332. Other locking elements, such as set screws or the like, could also be used to assist in fixing the extension member 380 relative to the instrument body 332. It is understood that the locking element and/or tool engagement surface could also be provided adjacent the opposite side of the extension member 380. In another embodiment, the friction between the extension member 380 and the distal end 336 of the instrument body 332 could be sufficiently large prevent the requirement for a separate locking element.

One of the ends of the extension member 380 may also be provided with a tool engagement surface 384, such as a surface with a hex nut shape, to assist in rotating the extension member 380 relative to the instrument body 332. It is understood that the instrument element 330 could be designed without the tool engagement surface 384. For example, extension member 380 could be designed for manual adjustment without the need for a mechanical advantage, thereby eliminating any need for a tool engagement surface.

When preparing the instrument 335 for use, the guide element 337 of the instrument element 330 and the guide element 188 of the adapter may permit a macro adjustment of the instrument element 330 relative to the adapter 180. Once the macro adjustment is accomplished, the locking device 339 is activated (e.g., by tightening set screw locking devices) to lock the instrument body 332 relative to the adapter 180. Alternatively, or in addition, the extension member 380 could also be adjusted relative to the instrument body 332 to provide a micro adjustment. For example the extension member 380 could be adjusted by rotating the extension member 380 relative to the instrument body 332. The locking element 382, if provided, could then be applied to lock the extension member 380 relative to the instrument body 332.

Figure 10:
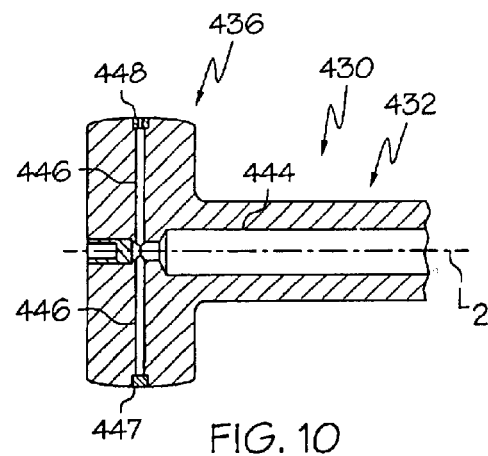
FIG. 10 is a partial vertical sectional view of another exemplary embodiment of an instrument element with a single outwardly facing nozzle and an opposed plug.

FIG. 10 illustrates one alternative exemplary embodiment of a single orifice instrument element 430. The instrument element 430 includes an instrument body 432 with a passage 444 in fluid communication with a passage 446. The instrument element 430 can include a single orifice located adjacent the distal end 436 of the instrument body 432. For example, the orifice may be defined by a nozzle 448 located adjacent the distal end 436. In addition, a plug 447 may be provided to prevent leakage of fluid from the opposite end of the passage 446. It will be appreciated that the instrument element 430 could be produced by modifying the instrument element 130, depicted in FIG. 2, by replacing one of the nozzles with a plug. Accordingly, the nozzles of FIG. 2 could be removable to allow one of the nozzles to be easily switched with a plug for a single orifice application.

Figure 11:
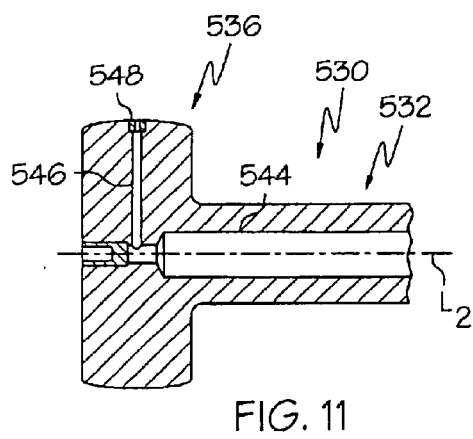
FIG. 11 is a partial vertical sectional view of another exemplary embodiment of an instrument element with a single outwardly facing nozzle.

FIG. 11 illustrates an instrument element 530 with a single orifice that may be defined, for example, with a nozzle 548. The instrument element 530 is similar to the instrument element 430 except passage 546 does not extend entirely from one side of the distal end 536 to the other side of the distal end, thereby removing the requirement of a plug to obtain a single-orifice instrument element. Rather, the passage 546 can extend to at least communicate with the passage 544 of the instrument body 532.

Figure 12:
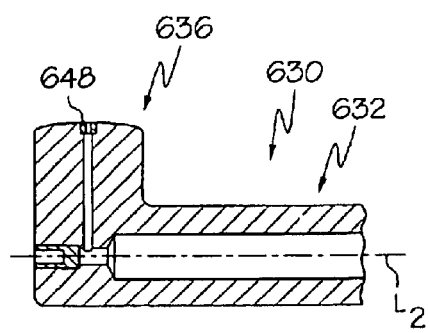
FIG. 12 is a partial vertical sectional view of still another exemplary embodiment of an instrument element with a single outwardly facing nozzle.

FIG. 12 illustrates an instrument element 630 with a single orifice that may be defined, for example, with a nozzle 648. The instrument element 630 is similar to the instrument element 530 except the enlarged distal end 636 is not symmetrical about the longitudinal axis ($L_2$) of the instrument body 632. An enlarged distal end that is at least substantially symmetrical with respect to the longitudinal axis ($L_2$) may be helpful to balance the instrument when rotating. Alternatively, as illustrated in FIG. 12 for example, the enlarged distal end 636 may be non-symmetrical with respect to the longitudinal axis ($L_2$) in order to save material costs. Moreover, the non-symmetrical arrangement would not present a balancing concern when taking stationary measurements or while measuring when the instrument is rotating at lower rotational speeds.

Figure 13:
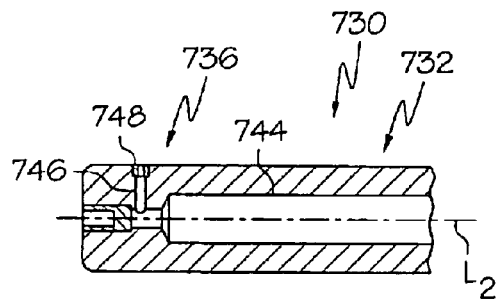
FIG. 13 is a partial vertical sectional view of yet another exemplary embodiment of an instrument element with a single outwardly facing nozzle.

FIG. 13 depicts an instrument element 730 with a distal end 736 including a passage 746 for communication between an orifice, that might be defined by a nozzle 748, and a passage 744 of the instrument body 732. The distal end is at least substantially symmetrically disposed about the longitudinal axis ($L_2$) and does not include an enlarged portion.

Providing a distal end with a smaller or no enlarged distal end can be useful in various applications. For example, the instrument element 730 could be used to obtain information about a workpiece having a bore hole of reduced size. It will also be understood that the enlarged portions of other embodiments of the present invention could also have further enlarged end portions to permit obtaining information about other workpieces. For instance, the enlarged distal end could be further enlarged to obtain information about a workpiece having an oversized bore hole.

Figure 14:
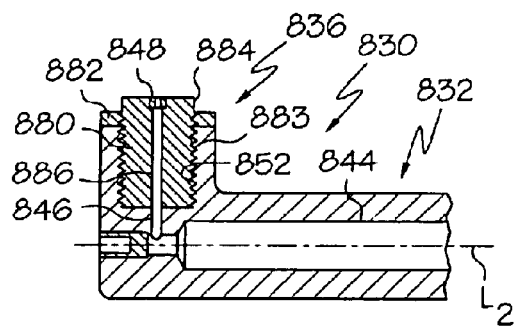
FIG. 14 is a partial vertical sectional view of an exemplary embodiment of an instrument element with a threaded adjustable extension member including an outwardly facing nozzle.

FIG. 14 illustrates an exemplary embodiment of an instrument element 830 with an extension member 880 at least partially located within an enlarged distal end 836. The extension member 880 includes a threaded portion 883 for being threadably received in a threaded bore 852 of the distal end 836. The extension member 880 may also include an optional tool engagement surface 884, such as a surface with a hexagonal shape, to assist in adjustment of the extension member 880 with respect to the instrument body 832. An optional locking member 882, such as a jam nut, may also be provided to assist in locking the extension member 880 relative to the instrument body 832. Accordingly, a single orifice, such as an orifice defined by the nozzle 848, may be adjusted with the extension member 880 relative to the instrument body 832 to accommodate a variety of workpieces. The orifice is in fluid communication with a passage 886 defined in the extension member 880. The passage 886 is also in fluid communication with passages 846 and 844 defined in the instrument body 832.

Figure 15:
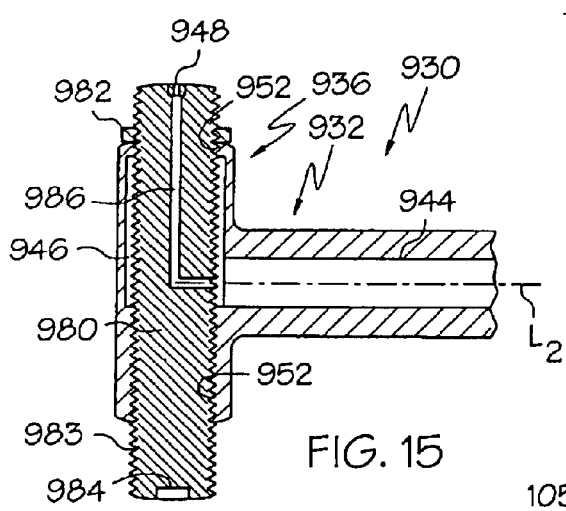
FIG. 15 is a partial vertical sectional view of an exemplary embodiment of an instrument element with a threaded adjustable extension member including an outwardly facing nozzle.

FIG. 15 depicts another exemplary instrument element 930 including an extension member 980 with a threaded portion 983 for being threadably received in a threaded bore portions 952 of an enlarged distal end 936 of the instrument body 932. The extension member 980 might include an optional tool engagement surface, similar to the tool engagement surface 884 discussed above and illustrated in FIG. 14. Alternatively, or in addition, the extension member 980 can include a tool engagement surface 984 comprising a recess to accommodate a tool such as a screw driver. In addition, a locking member 982, such as a jam nut, set screw, or the like, may be provided to lock the extension member 980 in position relative to the instrument body 932. The distal end 936 of the instrument body 932 includes a passage 946 that may, for instance, comprise a recessed annular groove in fluid communication with the passage 944 extending through the instrument body 932. The groove is recessed from adjacent threaded bore portions 952 adapted to threadably receive the extension member 980. A single orifice may be adjustable with the extension member 980, and may be defined, for example, by a nozzle 948 adjacent one end of the extension member 980. A passage 986 in the extension member 980 is adapted to maintain continuous fluid communication between the orifice and the passage 946. The annular nature of the passage 946, permits continuous fluid communication with the passage 986 regardless of the angular or linear position of the extension member 980 relative to the instrument element 932 within the adjustment range.

It will be understood that the connection between the threaded portions of the extension member and the instrument body of the embodiments described herein may be adapted to prevent substantial fluid leakage. For example, the connection between the extension member 880 and the instrument body 832, the connection between the extension member 980 and the instrument body 932, or other connections described herein and in accordance with the present invention, may be designed to prevent or at least minimize fluid leakage between the threads of the extension member and the bore. For example, a separate threaded gasket could be provided or the threads themselves could be designed to prevent leakage. In one embodiment, the bore could be fitted with a threaded anchor. The anchor could comprise a material, such as a synthetic material, that will assist in preventing fluid leakage between the threads.

Figure 16:
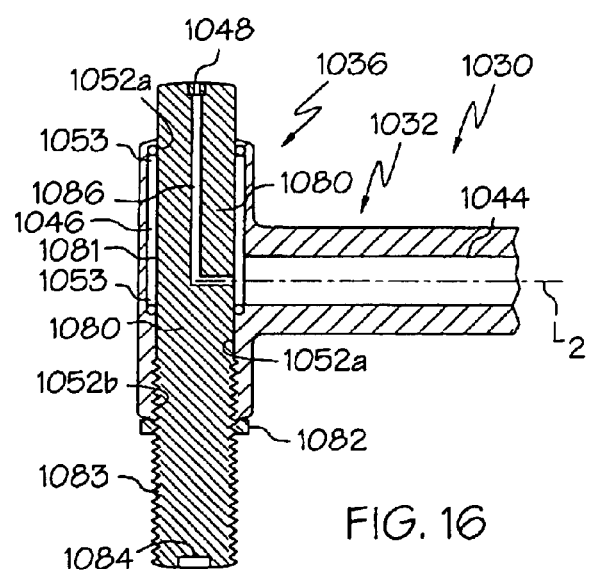
FIG. 16 is a partial vertical sectional view of another exemplary embodiment of an instrument element with a partially threaded adjustable extension member including an outwardly facing nozzle.

FIG. 16 depicts another embodiment of an instrument element 1030 that can have an alternative design to prevent fluid leakage. The instrument element 1030 has an extension member 1080 adjustably received by an enlarged distal end 1036 of the instrument body 1032. The distal end 1036 of the instrument body 1032 includes a passage 1046 that may, for instance, comprise a recessed annular groove in fluid communication with the passage 1044 extending through the instrument body 1032. As illustrated in FIG. 15, the annular groove defining the passage 1046 is recessed relative to substantially smooth bore portions 1052*a*. The substantially smooth bore portions 1052*a* may be provided with seals 1053, such as O-rings, to prevent fluid leakage between the extension member 1080 and the instrument body 1032. The extension member 1080 may comprise a substantially smooth portion 1081 adapted to cooperate with the seals 1053 to prevent fluid leakage. In addition, the extension member 1080 may include a threaded portion 1083 for being adjustably received by a threaded bore portion 1052*b*. An optional tool engagement surface 1084, such as a slot adapted to receive a screw driver, may be provided at one end of the extension member to assist in adjustment. In addition, a locking member 1082, such as a jam nut, set screw, or the like may be provided to lock the extension member 1080 relative to the instrument body 1032.

A single orifice may be provided for adjustment with the extension member 1080. For example, an orifice may be defined by a nozzle 1048. A passage 1086 provides continuous fluid communication between the passage 1046 and the orifice regardless of the relative adjustment between the extension member 1080 and the instrument body 1032. Accordingly, the sealing arrangement including the seals 1053 in continuous contact with the substantially smooth portion 1081 of the extension member 1080 may facilitate in providing a durable sealing arrangement for the instrument element 1030.

Figure 17:
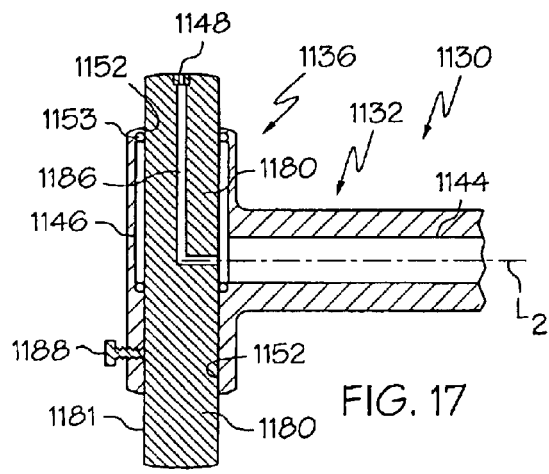
FIG. 17 is a partial vertical sectional view of an exemplary embodiment of an instrument element with a non-threaded adjustable extension member including an outwardly facing nozzle.

FIG. 17 depicts an alternative embodiment of an instrument element 1130 similar to the instrument element 1030 described above. However, the extension member 1180 does not include a threaded portion for adjustment. Rather, the extension member 1130 includes a substantially smooth outer surface 1181 adapted to be adjustably received in a non-threaded bore 1152. Adjustment may be manual, without the use of tools for example, wherein the friction between the seals 1153, such as O-rings, assists in locating the extension member 1180 relative to the instrument body 1132. A locking member 1188, such as a set screw, may also be provided to further assist in locking the extension member 1180 in position relative to the distal end 1136 of the instrument body 1132. The extension member 1180 includes an orifice, that may be defined by a nozzle 1148. The orifice may be adjusted with the extension member 1180 with respect to the instrument body 1132. As described more filly with respect to the embodiments of FIGS. 15 and 16 above, a passage 1144 is in fluid communication with a passage 1146 located in the distal end. The passage 1146 may comprise a recessed groove to permit fluid communication with the passage 1186 in communication with the orifice throughout the adjustment range. The seals 1153 provide structure to cooperate with the substantially smooth surface 1181 of the extension member 1180 to prevent fluid leakage.

Figure 18:
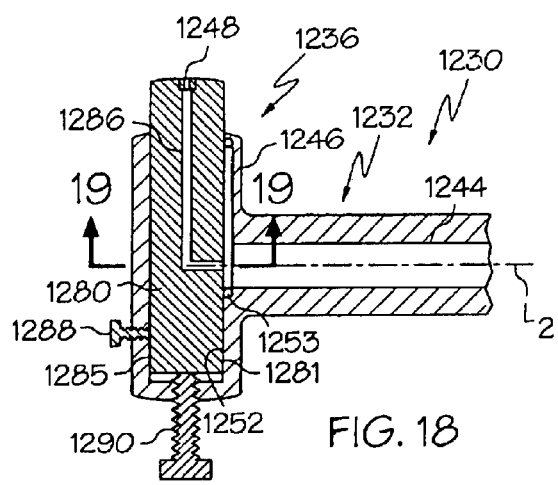
FIG. 18 is a partial vertical sectional view of an exemplary embodiment of an instrument element with a non-threaded and substantially non-rotatable, adjustable extension member including an outwardly facing nozzle.
Figure 19:
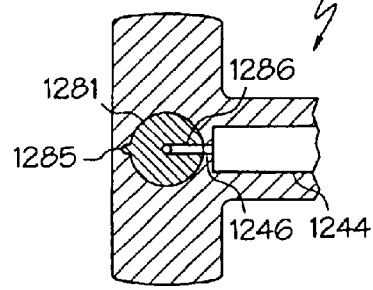
FIG. 19 is a partial sectional view along line 19—19 of FIG. 18.

FIG. 18 illustrates an instrument element 1230 with an instrument body 1232 having a passage 1244 in communication with a passage 1246, such as an elongated channel, defined in an enlarged distal end 1236. As illustrated in FIGS. 18 and 19, the passage may comprise a recessed channel in fluid communication with a passage 1286 defined in the extension member 1280. An orifice, defined by a nozzle 1238 for example, is capable of being adjusted with the extension member 1280 relative to the instrument body 1232. The interior surface of the bore 1252 can be substantially smooth and may be provided with a seal 1253, such as an O-ring, to abut a substantially smooth portion 1281 of the extension member 1280 to prevent leakage of fluid from the passage 1246. The instrument element 1230 can further comprise a locking member 1288, such as a set screw, to fix the location of the extension member 1280 relative to the instrument body 1232. In order to facilitate adjustment, an extension device, such as a plunger or an extension screw 1290 may be used to apply force to the extension member 1280 and therefore adjust the extension member 1280 relative to the instrument body 1232. The extension member 1280 can also be designed for non-rotatable adjustment relative to the instrument body 1232. FIG. 19 illustrates one structure for non-rotatable adjustment wherein the extension member 1280 includes a keyed portion 1285 for receipt in a keyed portion of the enlarged distal end 1236. Preventing rotation may be desirable to align the passage 1286 of the extension member 1280 with the passage 1246 defined in the distal end 1236. However, it is understood that the passage 1246 could be designed with an annular recess to allow rotation of the extension member 1280, as depicted with reference to the embodiments of FIGS. 15—17 for example.

Figure 20:
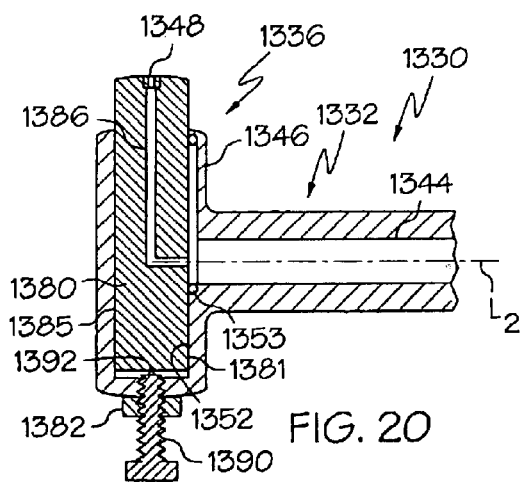
FIG. 20 is a partial vertical sectional view of another exemplary embodiment of an instrument element with a non-threaded and substantially non-rotatable, adjustable extension member including an outwardly facing nozzle.

FIG. 20 depicts yet another instrument element 1330 having an extension member 1380. The instrument element 1330 is similar to the instrument element 1230 in that the extension member may comprise a substantially smooth portion 1381 for cooperating with a substantially smooth bore 1352 of a distal end 1336 of the instrument body 1332. As with the embodiment illustrated in FIG. 18, the extension member 1380 may include a keyed portion 1385 to prevent relative rotation between the extension member 1380 and the instrument body 1332. Preventing rotation allows the passage 1346, such as an elongated channel, to be aligned with the passage 1386 of the extension member 1380 and therefore permits fluid communication between the passages 1344, 1346, and 1386 and the orifice that may be defined by a nozzle 1348 for example. The interior surface of the bore 1352 can be substantially smooth and may be provided with a seal 1353, such as an O-ring, to abut the substantially smooth portion 1381 of the extension member 1380 to prevent leakage of fluid from the passage 1346.

While the embodiment of FIG. 18 does not necessarily require connection between the extension device 1290 and the extension member 1280, the embodiment of FIG. 20 may include a joint 1392, such as a swivel joint, for connecting the extension member 1380 to the extension device 1390. However, the joint 1392 does not necessarily have to be a swivel joint in applications where the extension device 1390 is not threaded. For example, the could simply be an adhesive connection, weld, or the like when a non-threaded extension device, such as a plunger, is provided. Accordingly, the extension device 1390 of the instrument element 1330 assists in adjustment of the extension member 1380 while also fixing the extension member 1380 in place relative to the instrument element 1330. A locking member 1382, such as a jam nut, set screw, or the like may also be provided to lock the extension device 1390 and the extension member 1380 attached thereto, to the instrument body 1332.

Figure 21:
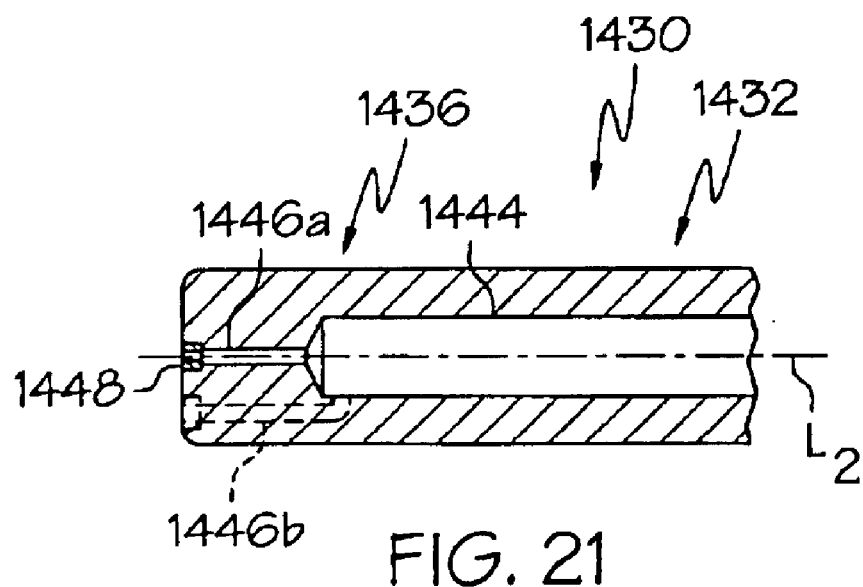
FIG. 21 is a partial vertical sectional view of another exemplary embodiment of an instrument element with an outwardly facing nozzle.

FIG. 21 depicts an instrument element 1430 including a single orifice adjacent a distal end 1436 of the instrument body 1432. As illustrated, the distal end 1436 is not enlarged but may be enlarged in certain applications. A passage 1446*a* may provide fluid communication between the passage 1444 and an orifice that may be defined by a nozzle 1448 to disperse fluid in an outward direction from the instrument body 1432 wherein the outward direction is substantially along the longitudinal axis ($L_2$) of the instrument body 1432. In an alternative embodiment, a passage 1446b and nozzle (shown in hidden lines) could be arranged to disperse fluid in a direction substantially parallel to the longitudinal axis ($L_2$) to permit movement of the orifice when the instrument element 1430 is rotated about the longitudinal axis ($L_2$).

Figure 22:
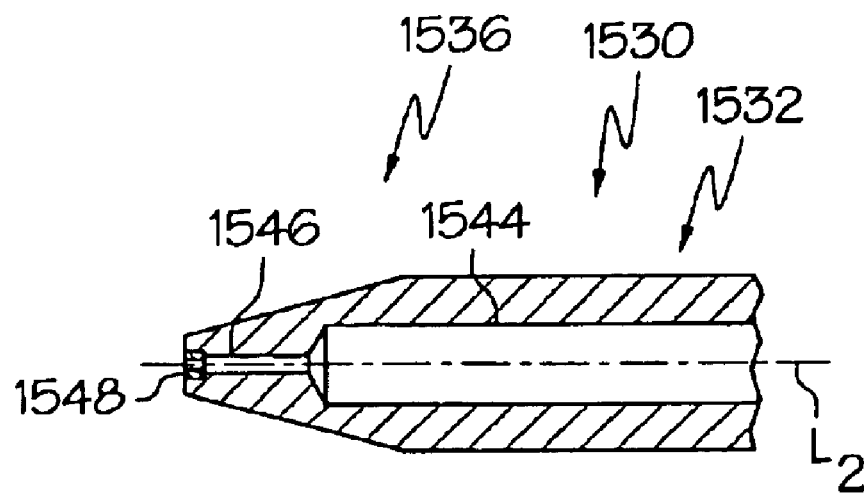
FIG. 22 is a partial vertical sectional view of still another exemplary embodiment of an instrument element with an outwardly facing nozzle.

FIG. 22 illustrates yet another embodiment of an instrument element 1530 including a distal end 1536 having a reduced portion to permit sufficient clearance between the workpiece and instrument element 1530. A passage 1546 defined in the instrument body 1532 may provide fluid communication between a passage 1544 and an orifice, for example, defined by the nozzle 1548 to disperse fluid in an outward direction from the instrument body 1532 substantially along the longitudinal axis ($L_2$) of the instrument element 1530.

It will be understood that the instrument elements in accordance with the present invention and described herein could comprise a single orifice, a pair of symmetrically disposed orifices, a plurality of pairs of symmetrically disposed orifices, a number of non-symmetrically disposed orifices or other arrangements of orifices. For example, FIGS. 10–22 depict various alternative embodiments of an instrument element with a single orifice. It is understood that these embodiments are illustrative in nature and that other single orifice instrument elements could be provided as desired. A single orifice instrument element might be used when analyzing the bore of a workpiece wherein the bore is tri-lobed, for example with an oversized triangular cross-sectional shape. An instrument with a pair of orifices, as illustrated in FIG. 2 for example, may mask this triangular shape by averaging the gauge distances of the two orifices. The single orifice embodiments will be able to properly map triangular surface of the bore. In addition, both single and multiple orifices could be used to analyze a bi-lobed bore having an elliptical cross-sectional shape.

It is also understood that each of the instrument elements depicted in FIGS. 1–22 or otherwise described in the specification could be used with any holding device, including an adapter and/or holding element in accordance with the present invention. In addition any adjustment of the orifice with respect to the holding element of any of the embodiments of the present invention may include indicators, such as indicia, scores or the like, for determining the relative position between parts of the instruments. For example, the extension member, if provided, could include indicators, such as score marks, on the outer surface of the extension member to assist in determining the position of the extension member relative to the distal end of the instrument body. In addition, if provided, the guide element of the adapter and/or instrument element could be provided with indicators, such as score marks, to assist in determining the relative position of the instrument element relative to the adapter.

FIGS. 23–27 depict alternative monitoring apparatus of an instrument station that are adapted to monitor the fluid to obtain information about a workpiece. The monitoring apparatus of FIGS. 23–27 could be used with any of the instruments depicted in FIGS. 1–22 to obtain information about a workpiece.

Figure 23:
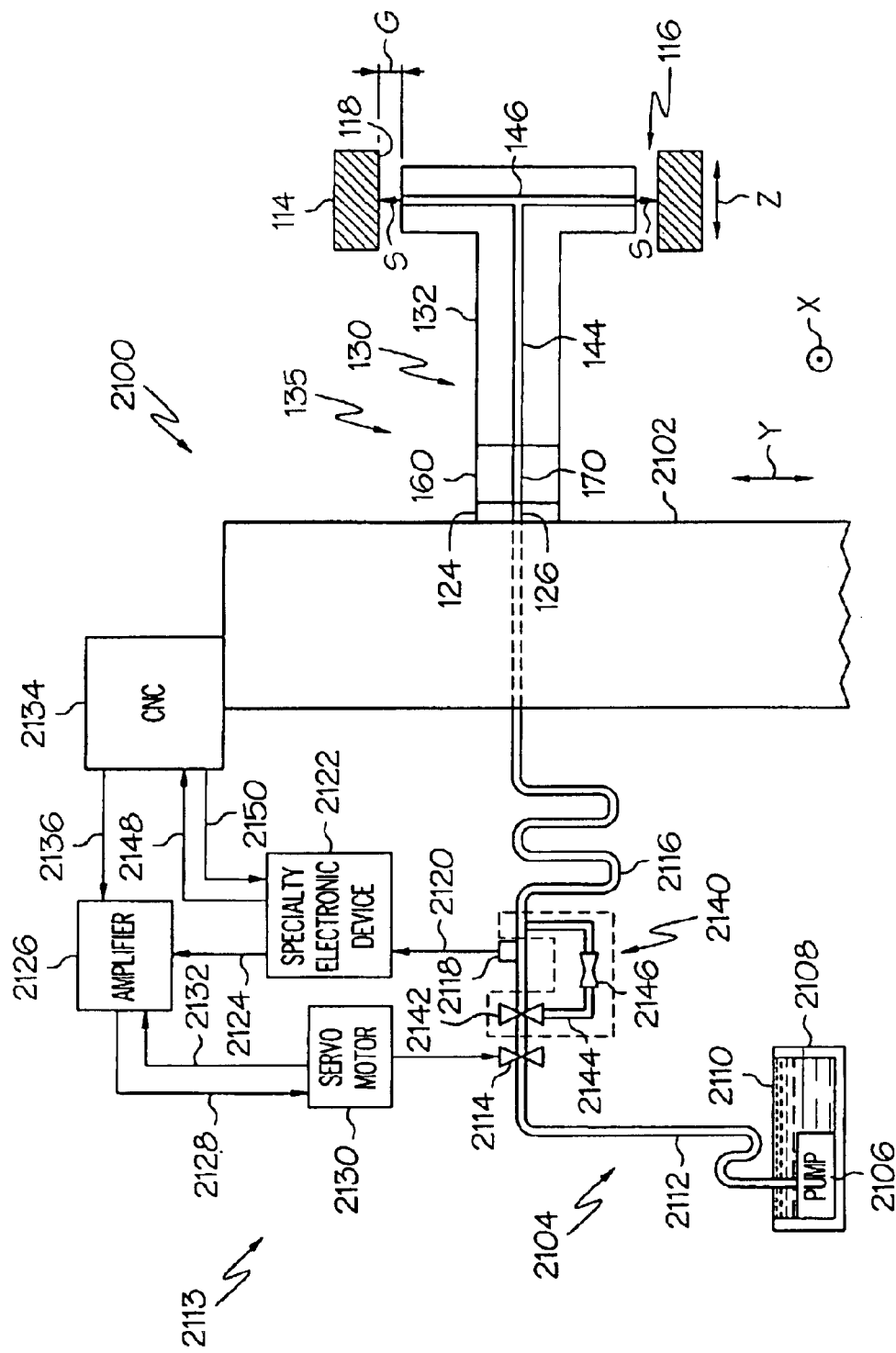
FIG. 23 is a first exemplary embodiment of parts of an instrument station in accordance with the present invention.

As shown in FIG. 23, for example, the instrument element 130 and holding element 160 may be assembled to provide the exemplary instrument 135 described above. The holding element 160 can be attached to the rotational member 124 of the instrument station 2100 such that the instrument 135 is attached to the base 2102 in a cantilever fashion.

The instrument station 2100 also includes a fluid delivery system 2104 adapted to provide the instrument 135 with fluid such that the fluid is dispersed from the orifices in an outward direction from the instrument body 132 (e.g., direction (S) as illustrated in the figures) towards the surface 118 of the workpiece 114.

A source of fluid 2108 comprises fluid 2110 that may be pumped with a pump 2106 through the feed pipe 2112, hose 2116, the passageway 126 of the rotational member 124, the passage 170 of the holder element 160, and passages 144, 146 of the instrument element 130. Orifices are oriented to disperse fluid in an outward direction (S) from the instrument body 132 towards a surface 118 of the workpiece 114.

A transducer may be provided to measure the flow and/or pressure characteristics of the fluid flowing through the system. For example, a pressure transducer 2118 may be provided to measure the fluid pressure within the system. The pressure transducer sends a signal 2120 to a specialty electronic device 2122. For instance, the signal 2120 may take the form of a 20 mA analog current signal. The specialty electronic device 2122 then sends a signal 2124 such as a quadrature "A quad B" signal to an amplifier 2126, such as a fanuc motor amplifier. The instrument station may optionally include a fluid servo control apparatus 2113 comprising a flow regulating device 2114, servo motor 2130 and amplifier 2126 for example. The amplifier 2126 sends a motor command signal 2128 to the servo motor 2130 in order to adjust the flow regulating device 2114, such as a spool-type pressure control valve. A controller 2134, such as a computerized numeric controller (CNC), may take flow commands from an operator and transmit this desired flow information as a command signal 2136 to the amplifier 2126. After comparing the command signal 2136 from the controller 2134 with the signal 2124 from the device 2122, an appropriate motor command signal 2128 activates the servo motor 2130 to adjust the valve 2114 to achieve the desired fluid flow. The servo motor 2130 may also provide an encoder feedback signal 2132 to the amplifier 2126.

The instrument station 2100 may also be provided with an optional monitoring apparatus 2140 for obtaining information about a surface 118 of a workpiece 114. FIG. 23 depicts one embodiment of the monitoring apparatus 2140 including a valve 2142, such as a solenoid valve, for redirecting fluid flow through a conduit 2144 when the instrument station 2100 is used to obtain information about a workpiece 114, rather than machining the workpiece. During the measurement mode, the valve 2142 directs the fluid through an orifice 2146, such as a tapered orifice, to increase the sensitivity and accuracy of the measurement procedure. In one embodiment, the diameter of the orifice 2146 is selected to be approximately equal to the instrument element orifice diameter such as the orifice diameter of the nozzle(s), to increase the linearity and sensitivity of the pressure versus gap size (G) relationship between the distal end 136 of the instrument element 130 and the surface 118 of the workpiece 114. The pressure transducer 2118, then measures the pressure within the feed pipe 2112 and sends a corresponding signal 2120 to the specialty electronic device 2122. The device 2122 may then send a fluid gauging feedback signal 2148 (e.g., in ASCII format) to the CNC 2134 which may in turn send back a reset signal 2150, such as an M-code commanded reset signal, back to the device 2122. The CNC 2134 may be provided with gauging information that relates pressure within the feed pipe 2112 to a corresponding gap distance (G) between the distal end 136 of the instrument and the surface 118 of the workpiece 114. Accordingly, the gap distance (G) may be displayed by the CNC 2134, corresponding to the fluid pressure within the feed pipe 2112 that is measured by the pressure transducer 2118.

Figure 24:
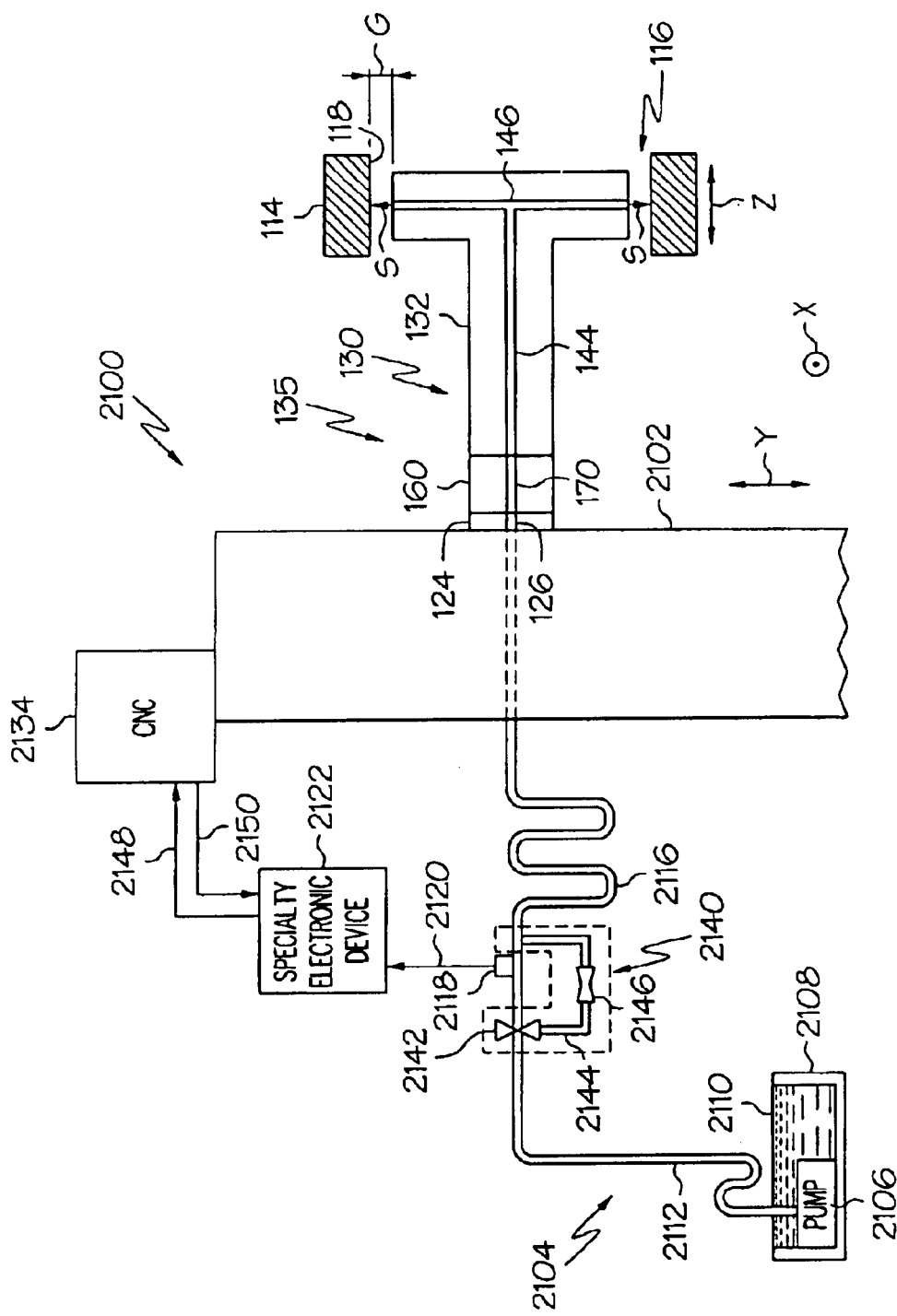
FIG. 24 is a second exemplary embodiment of parts of an instrument station in accordance with the present invention.

FIG. 24 depicts an alternative exemplary embodiment in accordance with the present invention that includes many of the components of FIG. 23 described above and functions in a similar manner. However, unlike the embodiment of FIG. 23, the instrument station depicted in FIG. 24 does not include a fluid servo control apparatus 2113 depicted in FIG. 23, and therefore does not include the control valve 2114, servo motor 2130 and amplifier 2126. Rather, the system of FIG. 24 would allow the fluid supply pump 2106 to deliver fluid 2110 directly to the instrument 135 to obtain information about a workpiece.

Figure 25:
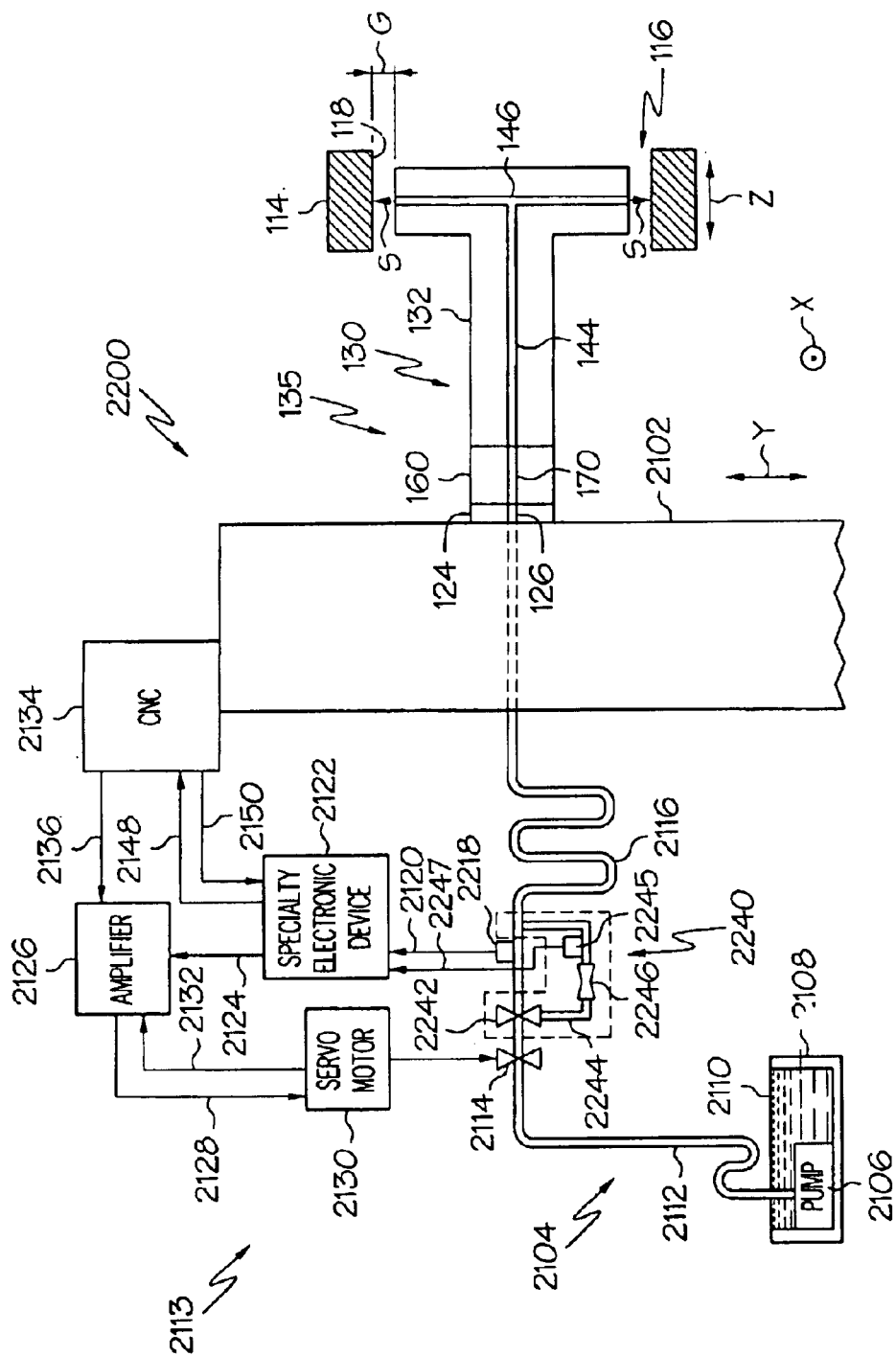
FIG. 25 is a third exemplary embodiment of parts of an instrument station in accordance with the present invention.

FIG. 25 depicts and alternative embodiment of a monitoring apparatus 2240 of an instrument station 2200 wherein, where like numerals with FIG. 23 indicate the same elements that function in an equivalent manner as described with reference to FIG. 23 above. A valve 2242, such as a solenoid valve, is provided for redirecting fluid flow through a conduit 2244 when the instrument station 2200 is used to obtain information about a workpiece 114, rather than machining the workpiece. During the measurement mode, the valve 2242 directs the fluid through an orifice 2246, such as a tapered orifice, to increase the sensitivity and accuracy of the measurement procedure. In one embodiment the diameter of the orifice 2246 is selected to be approximately equal to the instrument element orifice diameter such as the orifice diameter of the nozzle(s), to increase the linearity and sensitivity of the pressure versus gap size (G) relationship between the distal end 136 of the instrument element 130 and the surface 118 of the workpiece 114. An additional gauging pressure transducer 2245 may be provided for measuring the fluid pressure directly from the conduit 2244 when the instrument station 2200 is used to monitor the surface of the workpiece. Thus, a servo pressure transducer 2218 is used to measure the fluid pressure during the machining function, while the gauging pressure transducer 2245 may be used during the monitoring function.

When gauging, the gauging pressure transducer 2245 submits a signal 2247 to the specialty electronic device 2122. The device 2122 may then send a fluid gauging feedback signal 2148 (e.g., in ASCII format) to the CNC 2134 which may in turn send back a reset signal 2150, such as an M-code commanded reset signal, back to the device 2122. The CNC 2134 may be provided with gauging information that relates pressure within the conduit 2244 to a corresponding gap distance (G) between the distal end 136 of the instrument and the surface 118 of the workpiece 114. Accordingly, the gap distance (G) may be displayed by the CNC 2134, corresponding to the fluid pressure within the conduit 2244 that is measured by the gauging pressure transducer 2245.

Figure 26:
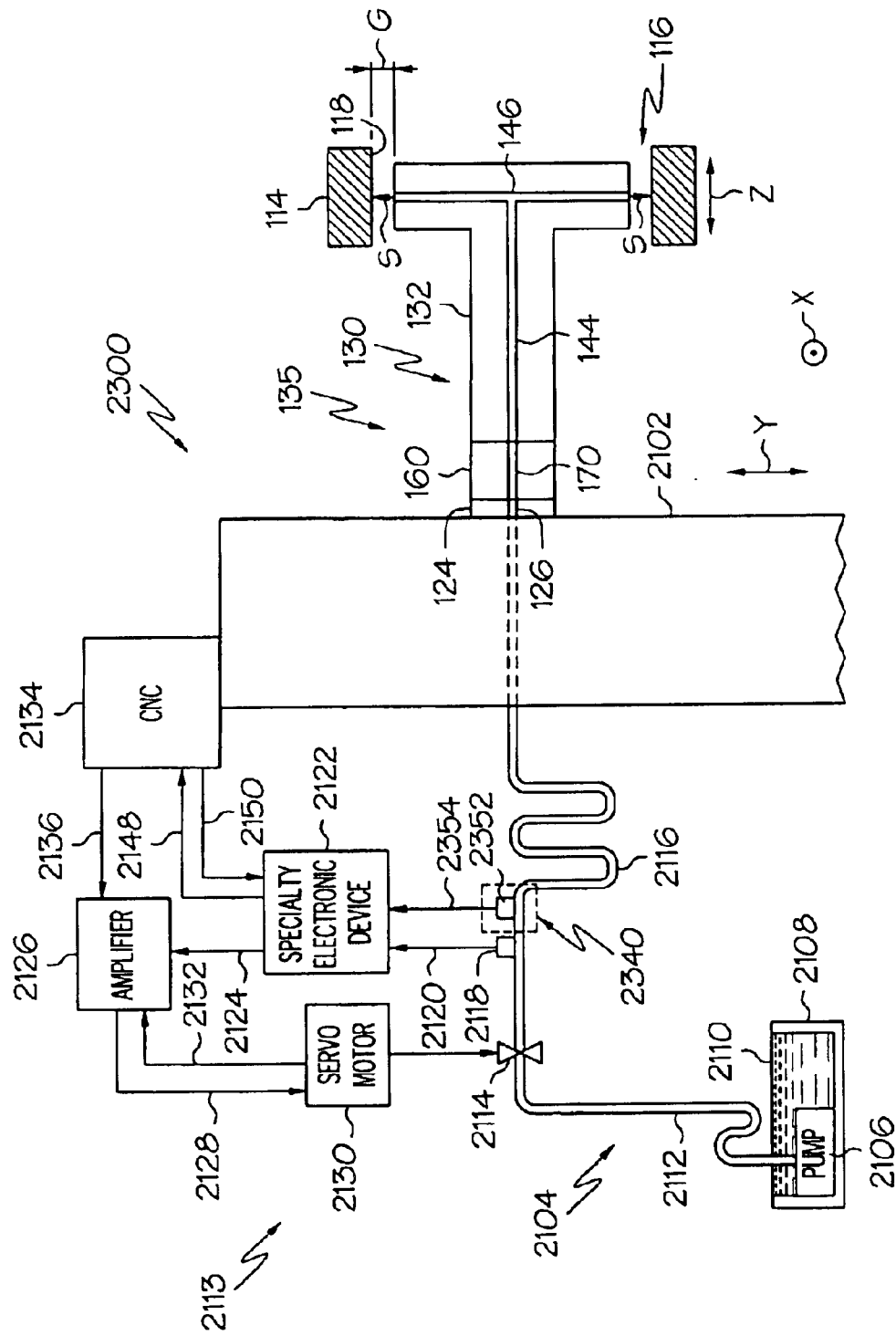
FIG. 26 is fourth exemplary embodiment of parts of an instrument station in accordance with the present invention.

FIG. 26 depicts an alternative embodiment of a monitoring apparatus 2340 of an instrument station 2300 wherein, where like numerals with FIG. 23 indicate the same elements that function in an equivalent manner as described with reference to FIG. 23 above. However, unlike the monitoring apparatus 2140, 2240 of FIGS. 23, 24 and 25 respectively, the monitoring apparatus 2340 comprises a flow transducer 2352 for measuring the fluid flow through the feed pipe 2112. Thus, a pressure transducer 2118 is used to measure the fluid pressure during the machining function, while the flow transducer 2352 may be used during the monitoring function. Although the monitoring apparatus 2340 could also comprise a conduit (e.g., 2144, 2244) and orifice (e.g., 2146, 2246) as illustrated in FIGS. 23, 24 and 25, such additional components may optionally be omitted.

When gauging, the flow transducer 2352 submits a signal 2354 to the specialty electronic device 2122. The device 2122 may then send a fluid gauging feedback signals 2148 (e.g., in ASCII format) to the CNC 2134 which may in turn send back a reset signal 2150, such as an M-code commanded reset signal, back to the device 2122. The CNC 2134 may be provided with gauging information that relates fluid flow within the feed pipe 2112 to a corresponding gap distance (G) between the distal end 136 of the instrument and the surface 118 of the workpiece 114. Accordingly, the gap distance (G) may be displayed by the CNC 2134, corresponding to the fluid flow within the feed pipe 2112 that is measured by the flow transducer 2352.

Figure 27:
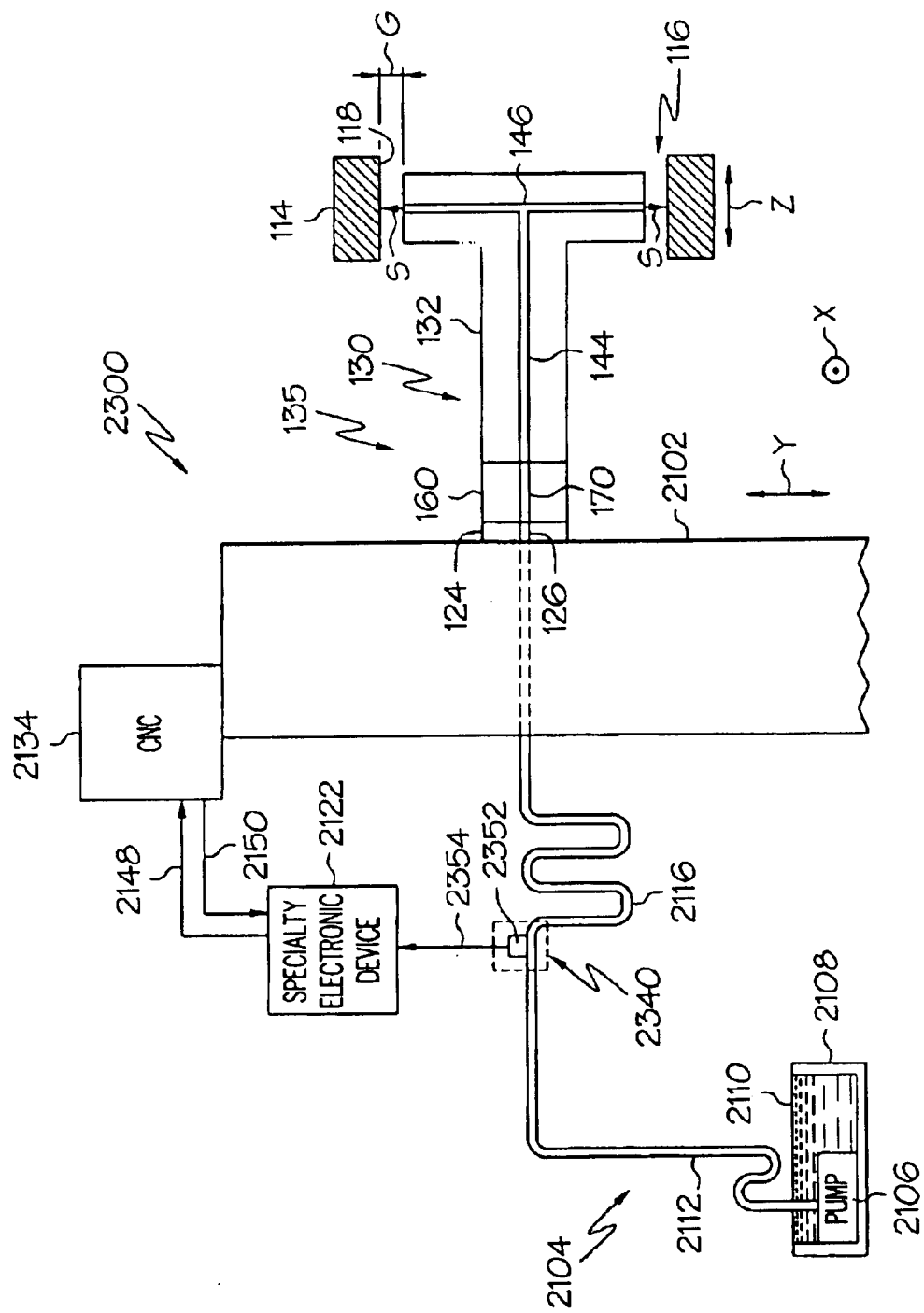
FIG. 27 is a fifth exemplary embodiment of parts of an instrument station in accordance with the present invention.

FIG. 27 depicts an alternative exemplary embodiment in accordance with the present invention that includes many of the components of FIG. 26 described above and functions in a similar manner. However, unlike the embodiment of FIG. 26, the instrument station depicted in FIG. 27 does not include a fluid servo control apparatus 2113 depicted in FIG. 26, and therefore does not include the control valve 2114, servo motor 2130, amplifier 2126 and pressure transducer 2118. Rather, the system of FIG. 27 would allow the fluid supply pump 2106 to deliver fluid 2110 directly to the instrument 135 to obtain information about a workpiece.

The instrument described herein may be used independent of the instrument station described above. Thus, the instrument may be used with an apparatus that does not have a rotatable member, such as a spindle, but merely gauges the surface characteristics of the workpiece. For example, a robot mechanism or other device could be provided to facilitate movement, such as rotational movement of the instrument. It is understood that any rotational movement discussed with reference to the present invention may include rotational movement about a single axis, rotational movement about a plurality of axes, an arcuate movement, pivotal movement, or the like. In these embodiments, either compressible or incompressible fluid may be used. For instance, incompressible fluid may be desirable in certain applications. The incompressible nature of the fluid enhances the safety of the device since compressible fluids may provide a dangerous work environment due to the possible explosive nature of highly compressed compressible fluid. In addition, using incompressible fluid may provide a greater linear response between gap distance and either fluid pressure or fluid flow. Incompressible fluid also allows for a greater gap distance between the instrument and the workpiece while still maintaining an accurate measurement, thereby reducing the chances of damaging the instrument by the close proximity to and/or jamming the instrument within the workpiece.

In one embodiment of the present invention, a method is disclosed for obtaining information about a workpiece using the instrument. A workpiece is provided that requires measurement. An apparatus is also provided that comprises an instrument, substantially incompressible fluid, a fluid source for providing the fluid, and a monitoring apparatus. The instrument may be supplied with substantially incompressible fluid from the fluid source such that the fluid is dispersed from the instrument and contacts a surface of the workpiece. The fluid may also be monitored (e.g., flow, pressure, etc.) with the monitoring apparatus to obtain information about the workpiece.

Both incompressible and compressible fluid may also be used in accordance with the present invention. For instance the fluid 2110 of the present invention may either be compressible or incompressible when used with the instrument stations 2100, 2200, 2300 discussed above. Using either the instrument stations 2100, 2200, 2300, or the like, another embodiment of the present invention includes a method of obtaining information about a workpiece. A workpiece including at least one surface is provided. An instrument station is also provided that includes a rotational member (e.g., spindle), an instrument including a first end and a second end, the first end adapted to be attached to the rotational member (e.g., either directly or through a holding device), a fluid source for providing fluid, and a monitoring apparatus (e.g., monitoring the fluid flow, fluid pressure, etc.). The instrument is provided with fluid from the fluid source such that fluid is dispersed in an outward direction from the instrument. The second end of the instrument is oriented adjacent the surface such that fluid dispersed from the instrument contacts the surface of the workpiece. The fluid is then monitored with the monitoring apparatus to obtain information about the workpiece.

In accordance with another embodiment of the present invention, compressible or incompressible fluid may be used with the instrument stations 2100, 2200, 2300, or the like, in order to determine the center of a bore, cavity, or the like, defined in a workpiece. A workpiece including at least one surface defining a bore, cavity, or the like, is provided. An instrument station is also provided including a rotational member, an instrument including a first end and a second end, the first end adapted for attachment to the rotational member, a fluid source for providing fluid (e.g., compressible, incompressible fluid), and a monitoring apparatus. The instrument is provided with fluid such that the fluid is dispersed in an outward direction from the instrument. The instrument is then rotated and the second end of the instrument is at least partially inserted into the bore at a predetermined position such that fluid dispersed from the instrument contacts the wall defining the bore. The fluid is monitored with the monitoring apparatus as the instrument rotates and disperses fluid. In this application, for example, there may be one fluid stream emitted from the instrument. Thus, if off center, the instrument will provide a changing fluid pressure and/or fluid flow as the instrument rotates and the orifice of the nozzle moves closer to and away from the surface of the bore as the instrument rotates a full 360 degrees. Thus, the instrument will be able to determine the center position relative to the predetermined position based on the gauged distances measured as the instrument rotates 360 degrees. The instrument, may then be reoriented such that it is located in the center position of the bore. The diameter of the bore may then be measured from the center location in a more accurate manner.

Thus the embodiments of the present invention may be used with either a compressible or incompressible fluid. It is contemplated that either may be provided and that the instrument station includes a switch or other device to change from a compressible fluid mode of operation to an incompressible fluid mode of operation.

While the present invention is illustrated as measuring the interior bore surface of a workpiece, it is within the scope of the present invention to measure other surfaces such as interior or exterior planar, non-planar, surfaces or other three dimensional shapes and/or surfaces and can be used to map a surface of a workpiece.

In one application, the surface or topography of the bore could be mapped and compared with a predetermined tolerance of minimum and maximum bore dimensions and printed out for visual inspection. For example, a three dimensional color map could be generated where each color indicates compliance or deviation from the predetermined tolerance requirements. The information obtained can include any variety of structural characteristics of a workpiece, such as, for example, tolerance comparisons and/or deviations from a desired shape, size, surface, finish, quality control testing, discontinuity monitoring or verification and/or any other gauging or measuring of at least a portion of a structure.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art of the above teaching. Accordingly, this invention is intended to embrace all alternatives, modifications and variations that have been discussed herein, and others that fall within the spirit and broad scope of the claims.

What is claimed is:

1. An instrument station for obtaining information about a workpiece comprising:
   a) a source including a substantially incompressible fluid;
   b) an instrument in fluid communication with the source, the instrument including a fluid dispersing orifice for dispersing an amount of the substantially incompressible fluid;
   c) a rotational member connected to the instrument for rotating the instrument about a rotational axis; and
   d) a fluid monitoring apparatus associated with the instrument for monitoring a parameter of the substantially incompressible fluid;
   wherein the instrument further comprises a body and an extension member adapted to be adjusted relative to the body, and wherein the orifice is adapted to be adjusted with the extension member.

2. The instrument station of claim 1, wherein the orifice comprises a plurality of orifices.

3. The instrument station of claim 1, wherein the instrument is configured such that only a single orifice can disperse fluid in use.

4. The instrument station of claim 1, wherein the body includes an enlarged portion, wherein the orifice is adapted to be located adjacent to the enlarged portion.

5. The instrument station of claim 1, wherein the body includes an enlarged portion and wherein the extension member is adapted to be adjusted relative to the enlarged portion.

6. The instrument station of claim 1, wherein the extension member is adapted to be adjustably received in the body.

7. The instrument station of claim 6, wherein the extension member is adapted to be slidably received in the body.

8. The instrument station of claim 7, wherein the extension member has a shape for non-rotatable slidable insertion in the body.

9. The instrument station of claim 6, wherein the extension member is threadably received in the body.

10. The instrument station of claim 1, wherein the orifice is oriented to disperse fluid in an outward direction from the body.

11. The instrument station of claim 10, wherein the instrument includes a longitudinal axis and wherein the outward direction extends along the longitudinal axis of the instrument.

12. The instrument station of claim 10, wherein the instrument includes a longitudinal axis and wherein the outward direction is substantially parallel to the longitudinal axis of the instrument.

13. The instrument station of claim 10, wherein the instrument includes a longitudinal axis and wherein the outward direction extends at an angle relative to the longitudinal axis of the instrument.

14. The instrument station of claim 13, wherein the angle between the outward direction and longitudinal axis is approximately 90°.

15. The instrument station of claim 1, wherein the orifice comprises a pair of orifices.

16. The instrument station of claim 15, wherein the instrument includes a longitudinal axis and the pair of orifices comprises a first orifice and a second orifice that are symmetrically disposed about the longitudinal axis.

17. The instrument station of claim 16, wherein the longitudinal axis and the first and second orifices are disposed adjacent a single imaginary plane.

18. The instrument station of claim 1, wherein the instrument comprises a first end and a second end, wherein said instrument is attached to the rotational member adjacent said first end.

19. The instrument station of claim 1, wherein the instrument defines a passage for allowing the amount of incompressible fluid to pass from adjacent the first end towards the second end.

20. The instrument station of claim 19, wherein the rotational member provides fluid communication between the passage and the fluid source.

21. The instrument station of claim 1, further comprising a holding device, wherein the instrument is attached to the rotational member with the holding device.

22. The instrument station of claim 21, wherein the holding device comprises a holding element.

23. The instrument station of claim 22, wherein the holding device further comprises an adapter.

24. The instrument station of claim 21, wherein the holding device comprises an adapter.

25. The instrument station of claim 24, wherein the adapter permits the instrument element to be radially adjusted relative to the rotational axis.

26. The instrument station of claim 24, wherein the adapter comprises a dove-tail element.

27. The instrument station of claim 1, wherein the fluid monitoring apparatus is adapted to monitor back pressure of the fluid.

28. The instrument station of claim 1, wherein the fluid monitoring apparatus is adapted to monitor resistance of fluid flow.

29. The instrument station of claim 1, wherein the fluid monitoring apparatus is adapted to monitor fluid flow.

30. The instrument station of claim 1, further comprising a fluid servo control apparatus.

31. A method of obtaining information about a workpiece comprising the steps of:
    a) providing a workpiece including a surface;
    b) providing an instrument station including: a rotational member including a rotational axis, a source including a substantially incompressible fluid, an instrument in fluid communication with the source and including a first end and a second end, a fluid servo control apparatus adapted to selectively adjust fluid flow, and a monitoring apparatus;
    c) attaching the instrument to the rotational member adjacent the first end of the instruments;
    d) providing the instrument with an amount of the substantially incompressible fluid from the source;
    e) dispersing the amount of substantially incompressible fluid in an outward direction from the instrument;
    f) orienting the second end of the instrument adjacent the surface such that the amount of substantially incompressible fluid dispersed from the instrument contacts the surface of the workpiece; and
    g) monitoring a parameter of the substantially incompressible fluid with the monitoring apparatus to obtain information about the workpiece;
    further comprising the step of adjusting fluid flow with the fluid servo control apparatus.

32. The method of claim 31, further comprising the step of rotating the rotational member while monitoring the fluid.

33. The method of claim 31, further comprising the step of radially offsetting the instrument from the rotational axis.

34. The method of claim 31, wherein said instrument further includes a fluid dispersing orifice for dispersing an amount of the fluid, a body and an extension member adapted to be adjusted relative to the body, wherein the orifice is adapted to be adjusted with the extension member.

35. The method of claim 31, wherein said fluid servo control apparatus comprises:
    a flow regulating device;
    a servo motor; and
    an amplifier;
    wherein said step of adjusting fluid flow comprises sending a command signal from the amplifier to the servo motor for adjusting the flow regulating device.

36. An apparatus for obtaining information about a workpiece comprising:
    a) a source including a substantially incompressible fluid;
    b) an instrument in fluid communication with the source, the instrument including a fluid dispersing orifice for dispersing an amount of the substantially incompressible fluid, a body and an extension member adapted to be adjusted relative to the body, and wherein the orifice is adapted to be adjusted with the extension member; and
    c) a fluid monitoring apparatus associated with the instrument for monitoring a parameter of the substantially incompressible fluid;
    wherein the instrument further includes a body and an extension member adapted to be adjusted relative to the body, and wherein the orifice is adapted to be adjusted with the extension member.

37. The apparatus of claim 36, further comprising a fluid servo control apparatus.

38. The apparatus of claim 36, further comprising a holding device adapted to selectively attach the instrument to a rotational member for rotational operation.

39. The apparatus of claim 36, wherein the extension member is adapted to be adjustably received in the body.

40. The apparatus of claim 39, wherein the extension member is adapted to be slidably received in the body.

41. The apparatus of claim 40, wherein the extension member has a shape for non-rotatable slidable insertion in the body.

42. The apparatus of claim 39, wherein the extension member is threadably received in the body.

43. An instrument station for obtaining information about a workpiece comprising:
    a) a rotational member;
    b) a source including a substantially incompressible fluid;
    c) an instrument adapted to be attached to the rotational member for fluid communication with the source, the instrument including a fluid dispersing orifice adapted to be placed in selective fluid communication with the source, a body including a first end and a second end, wherein the first end is adapted for removable connection to the rotational member, and an extension member adapted to be adjusted relative to the body, wherein the orifice is adapted to be adjusted with the extension member; and d) a fluid monitoring apparatus associated with the instrument for monitoring a parameter of the substantially incompressible fluid.

44. The instrument station of claim 43, wherein the instrument defines a passage for allowing substantially incompressible fluid to pass from adjacent to the first end towards the second end.

45. A method of obtaining information about a workpiece comprising the steps of:

a) providing a workpiece including a surface;

b) providing an apparatus comprising: an instrument including a fluid dispersing orifice, a body and an extension member adapted to be adjusted relative to the body, wherein the orifice is adapted to be adjusted with the extension member, a source for providing a substantially incompressible fluid, and a fluid monitoring apparatus;

c) supplying substantially incompressible fluid to the instrument such that the fluid is dispersed from the instrument and contacts the surface of the workpiece; and d) monitoring the fluid with the fluid monitoring apparatus.

46. A method of determining the center of a bore defined in a workpiece comprising the steps of:

a) providing a workpiece including a surface defining a bore;

b) providing an instrument station including: a rotational member, an instrument including a first end and a second end, and adapted for attachment adjacent said first end to the rotational member, a source for providing a fluid, and a fluid monitoring apparatus;

c) providing the instrument with fluid from the source such that fluid is dispersed in an outward direction from the instrument;

d) rotating the instrument;

e) inserting the second end of the instrument at least partially into the bore at a predetermined position such that fluid dispersed from the instrument contacts the surface defining the bore;

f) monitoring the fluid with the monitoring apparatus as the instrument rotates and disperses fluid; and g) determining the center position of the bore relative to the predetermined position based on the information obtained from the fluid monitoring apparatus.

47. The method of claim 46, wherein the fluid comprises a substantially incompressible fluid.

* * * * *

UNITED STATES PATENT AND TRADEMARK OFFICE
CERTIFICATE OF CORRECTION

PATENT NO. : 6,901,797 B2  Page 1 of 1
DATED : June 7, 2005
INVENTOR(S) : Hyatt et al.

It is certified that error appears in the above-identified patent and that said Letters Patent is hereby corrected as shown below:

Column 21,
Line 19, change "said" to -- the --.
Line 27, delete "fluid".

Signed and Sealed this

Twenty-third Day of August, 2005

JON W. DUDAS
*Director of the United States Patent and Trademark Office*